(12) United States Patent
Hasman

(10) Patent No.: US 7,570,427 B2
(45) Date of Patent: Aug. 4, 2009

(54) GEOMETRICAL PHASE OPTICAL ELEMENTS WITH SPACE-VARIANT SUBWAVELENGTH GRATINGS

(75) Inventor: Erez Hasman, Hadera (IL)

(73) Assignee: Technion Research & Development Foundation Ltd., Haifa (IL)

( * ) Notice: Subject to any disclaimer, the term of this patent is extended or adjusted under 35 U.S.C. 154(b) by 566 days.

(21) Appl. No.: 10/519,701

(22) PCT Filed: Jun. 26, 2003

(86) PCT No.: PCT/IL03/00541

§ 371 (c)(1),
(2), (4) Date: Jan. 5, 2006

(87) PCT Pub. No.: WO2004/003596

PCT Pub. Date: Jan. 8, 2004

(65) Prior Publication Data

US 2006/0126183 A1 Jun. 15, 2006

(51) Int. Cl.
*G02B 5/18* (2006.01)
*G02B 5/30* (2006.01)
(52) U.S. Cl. .................. 359/566; 359/575; 359/486; 359/489
(58) Field of Classification Search .......... 359/575, 359/489
See application file for complete search history.

(56) References Cited

U.S. PATENT DOCUMENTS

2008/0226844 A1* 9/2008 Shemo et al. ................. 428/1.1

OTHER PUBLICATIONS

Highly improved convergence of the coupled-wave method of TM polarization, Lalanne and Morris. vol. 13, No. 4/Apr. 1996/J. Opt. Soc. AM. A, Optical Society of America, 1996.

Real-time analysis of partially polarized light with a space-variant subwavelength dielectric grating, Bomzon, Biener, Kleiner, and Hasman, Optics Letters / vol. 27, No. 3 / Feb. 1, 2002, Optical Society of America, 2002.

(Continued)

*Primary Examiner*—Fayez G Assaf
(74) *Attorney, Agent, or Firm*—Pearl Cohen Zedek Latzer, LLP

(57) ABSTRACT

A space variant polarization optical element for spatially manipulating polarization-dependent geometrical phases of an incident light beam. The element comprises a substrate with a plurality of zones of gratings with a continuously varying orientation. The orientation denoted by $\theta(x-y)$ is equal to half of a desired geometrical phase (DGP) modulus $2\pi$. Each grating has a local period that is smaller than the wavelength of the incident light beam. In other embodiments of the present invention the substrate comprises a plurality of zones of gratings with a continuously varying orientation.

66 Claims, 25 Drawing Sheets

OTHER PUBLICATIONS

Computer-generated space-variant polarization elements with subwavelength metal strips, Bomzon, Kleiner, and Hasman, Optics Letters/ vol. 26, No. 1/ Jan. 1, 2001, Optical Society of America 2001.

Polarization beam Splitters using polarization diffraction gratings, Davis and Adachi, Optics Letters/vol. 26, No. 9/ May 1, 2001, Optical Society of America 2001.

Paraxial- domain diffractive elements with 100% efficiency based on polarization gratings, Tervo and Turunen, Optics Letters/vol. 25, No. 11/ Jun. 1, 2000, Optical Society of America 2000.

Pancharatnam-Berry phase in space-variant polarization-state manipulations with subwavelength gratings, Bomzon, Kleiner and Hasman, Optics Letters / vol. 26, No. 18/ Sep. 15, 2001.

Polarizing diffraction-grating triplicators, Frenandez-Pousa and Moreno, Optics Letters / vol. 26, No. 21, Nov. 1, 2001, Optical Society of America 2001.

Measuring Stokes parameters by means of a polarization grating, Franco Gori, Optics Letters / vol. 24, No. 9, May 1, 1999, Optical Society of America 1999.

Radially and azimuthally polarized beams generated by space-variant dielectric subwavelength gratings, Bomzon, Biener, Kliener and Hasman, Optics Letters / vol. 27, No. 5/ Mar. 1, 2002, Optical Society of America 2002.

Integrated polarimeters based on anisotropic photodetectors, R.M.A. Azzam, Optics Letters / vol. 12, No. 8, Aug. 1987, Optical Society of America 1987.

Comparison of polarized-light propagation in biological tissue and phantoms, Vanitha Sankaran, Optics Letters / vol. 24/ No. 15, Aug. 1, 1999 Optical Society of America 1999.

Multichannel Mueller matrix ellipsometer for real-time spectroscopy of anisotropic surfaces and films, Lee, Koh, and Collins, Optics Letters / vol. 25 No. 21/ Nov. 1, 2000 Optical Society of America 2000.

Efficient multilevel phase holograms for CO2 lasers, Hasman, Davidson, and Freisem, Optics Letters / vol. 16 No. 6/ Mar. 15, 1991, Optical Society of America 1991.

Four channel polarimeter for time-resolved ellipsometry, G.E. Jellison, Jr. Optics Letters / vol. 12 No. 10/ Oct. 1987, Optical Society of America 1987.

Space-variant polarization state manipulation with computer-generated subwavelength metal stripe gratings, Bomzon, Kleiner, and Hasman, Optics Communications 192, Jun. 1, 2001, Elsevier Science B.V.2001.

Quantal phase factors accompanying adiabatic changes, M.V. Berry, Proc. R. Soc. Lond. A 392, 45-57, (1984), R. Soc. Lond. 1984.

Observation of a Nonclassical Berry's Phase for the Photon, Kwiat and Chiao, Physical Review Letters/vol. 66, No. 5/ Feb. 4, 1991, The American Physical Society, 1991.

Real-time principal state characterization of use in PMD compensators, Chou, Fini, and Haus, IEEE Photonics Technology Letters, vol. 13, No. 6/ Jun. 2001, IEEE 2001.

Nematic liquid-crystal polarization gratings by modification of surface alignment, Wen, Petschek, and Rosenblatt, Applied Optics / vol. 41, No. 7/ Mar. 1, 2002, Optical Society of America, 2002.

Micropolarizer array for infrared imaging polarimetry, Nordin, Meier, Deguzman, and Jones, J. Opt. Soc. AM A/ vol. 16, No. 5/May 1999, Optical Society of America, 1999.

Formation of radially and azimuthally polarized light using space-variant subwavelength metal stripe gratings, Bomzon, Kleiner, and Hasman, Applied Physics Letters vol. 79, No. 11, Sep. 10, 2001, American Institute of Physics, 2001.

Space-variant Panchartnam-Berry phase optical elements with computer-generated subwavelength gratings, Bomzon, Beiner, Kleiner, and Hasman, Optics Letters / vol. 27 No. 13/ Jul. 1, 2002, Optical Society of America 2002.

Polarization of light and topological phases, Rajendra Bhandari, Physics Reports 281 (997) 1-64, Elsevier Science B. V., 1997.

Generalized theory of interference and its applications, S. Pancharatnem, The Proceedings of the Indian Academy of Sciences, vol. XLIV, No. 5, Sec. A. 1956.

Evolving geometric phase and its dynamic manifestation as a frequency shift: an optical experiment, Simon, Kimble and Sudarshan, Physical Review letters, vol. 61 No. 1, Jul. 4, 1988, The American Physical Society, 1988.

* cited by examiner

GEOMETRICAL PHASE OPTICAL ELEMENTS WITH SPACE-VARIANT SUBWAVELENGTH GRATINGS

FIELD OF THE INVENTION

The present invention relates to optical elements. More particularly it relates to geometrical phase optical elements with space-variant subwavelength gratings and their uses thereof

BACKGROUND OF THE INVENTION

The Pancharatnam-Berry phase is a geometrical phase associated with the polarization of light. When the polarization of a beam traverses a closed loop on the Poincare sphere, the final state differs from the initial state by a phase factor equal to half the area $\Omega$, encompassed by the loop on the sphere (see S. Pancharatnam, Proc. Ind. Acad. Sci. A 44, 247 (1956), and M. V. Berry, Proc. Roy. Soc. (London) A 392, 45 (1984)). In a typical experiment, the polarization of a uniformly polarized beam is altered by a series of space-invariant (transversely homogenous) waveplates and polarizers, and the phase, which evolves in the time-domain is measured by means of interference (see R. Simon, H. J. Kimble and E. C. G. Sudharshan, Phys. Rev. Lett. 61, 19 (1988), and P. G. Kwiat and R. Y. Chiao, Phys. Rev. Lett. 66, 588 (1991)).

Recently, a Pancharatnam-Berry phase in the space-domain was considered. Using space-variant (transversely inhomogeneous) metal stripe subwavelength gratings, we demonstrated conversion of circular polarization into radial polarization (see Z. Bomzon, V. Kleiner and E. Hasman, Appl. Phys. Lett. 79, 1587 (2001)), and showed that the conversion was accompanied by a space-variant phase modification of geometrical origin that effected the propagation of the beams (Z. Bomzon, V. Kleiner, and E. Hasman, Opt. Lett. 26, 1424 (2001)).

Previously Bhandari suggested using a discontinuous spatially varying waveplate as a lens based on similar geometrical phase effects (R. Bhandari, Phys. Rep. 281, 1 (1997)). Recent studies have investigated periodic polarization gratings (F. Gori, Opt. Lett. 24, 584 (1999), C. R. Fernández-Pousa, I. Moreno, J. A. Davis and J. Adachi, Opt. Lett. 26, 1651 (2001) and J. Tervo, and J. Turunen, Opt. Lett. 25, 785 (2000)). These authors showed that the polarization of the diffracted orders could differ from the polarization of the incident beam. We intend to prove and utilize a connection between the properties of such polarization gratings and the space-domain Pancharatnam-Berry phase.

BRIEF DESCRIPTION OF THE INVENTION

There is thus provided, in accordance with some preferred embodiments of the present invention a space variant polarization optical element for spatially manipulating polarization-dependent geometrical phases of an incident light beam, the element comprising a substrate comprising a plurality of zones of gratings with a continuously varying orientation, the orientation denoted by $\theta(x, y)$ which is equal to half of a desired geometrical phase (DGP) modulus $2\pi$, each grating with a local period that is smaller than the wavelength of the incident light beam.

Furthermore, in accordance with some preferred embodiments of the present invention, the orientation of the grating satisfies the equation $2\theta(x,y)=\pi r^2/\lambda f|_{mod\ 2\pi}$, where $f$ is a desired focal length and $\lambda$ is the wavelength of the incident light beam, whereby the optical element is used as a converging lens if the incident light beam exhibits right-hand circular polarization, and as a diverging lens if the incident light beam exhibits left-hand circular polarization.

Furthermore, in accordance with some preferred embodiments of the present invention, the following relation is maintained $\nabla \times K_g = 0$, where $K_g = K_0(x,y)[\cos(\phi_d(x,y)/2)\hat{x}+\sin(\phi_d(x,y)/2)\hat{y}]$, where $K_g$ is a grating vector, $\hat{x}$ and $\hat{y}$ are unit vectors in the x and y direction, $K_0 = 2\pi/\Lambda(x,y)$, where $K_0$ is the spatial frequency of the grating, $\Lambda$ is the local period of the grating and $\phi_d(x,y)/2$ is the space-variant direction of the vector so that it is perpendicular to the grating stripes at any given point.

Furthermore, in accordance with some preferred embodiments of the present invention, the optical element is used as diffraction grating element, wherein the following equation is maintained $\phi_d=(2\pi/d)x|_{mod\ 2\pi}$, where d is the period of the plurality of zones, and wherein the grating satisfies the relation $\phi_g(x,y)=(2d/\Lambda_0)\sin(\pi x/d)\exp(-\pi y/d)$, where $\Lambda_0$ is the local period of the grating at y=0.

Furthermore, in accordance with some preferred embodiments of the present invention, the substrate is a wafer.

Furthermore, in accordance with some preferred embodiments of the present invention, the wafer is manufactured using photolithography techniques.

Furthermore, in accordance with some preferred embodiments of the present invention, the wafer is manufactured using etching.

Furthermore, in accordance with some preferred embodiments of the present invention, the grating is in blazed form, with opposite blazed directions for incident left-hand circular polarization and for right-hand circular polarization, of the incident light beam.

Furthermore, in accordance with some preferred embodiments of the present invention, the orientation of the gratings varies linearly in a predetermined direction.

Furthermore, in accordance with some preferred embodiments of the present invention, the orientation of the grating of the zones satisfies the equation $\theta(x)=-\pi x/d|_{mod\ \pi}$, where $\theta(x)$ is the orientation of a grating line at a position x on an axis, and d is the period of the orientation of the grating of the zones.

Furthermore, in accordance with some preferred embodiments of the present invention, the optical element is used as an optical switch.

Furthermore, in accordance with some preferred embodiments of the present invention, the optical element is used as a beam-splitter.

Furthermore, in accordance with some preferred embodiments of the present invention, the optical element is used as a Lee-type binary subwavelength structure mask.

Furthermore, in accordance with some preferred embodiments of the present invention, the optical element is used for polarimetry.

Furthermore, in accordance with some preferred embodiments of the present invention, the grating in each zone comprise of at least two regions of gratings arranged in different orientations.

Furthermore, in accordance with some preferred embodiments of the present invention, the following relation is satisfied, $\theta(x,y)=\omega(x,y)+c$, where x and y are coordinates of a specific position in an orthogonal set of axes, $\omega=\arctan(y/x)$ is the azimuthal angle, and c is a constant.

Furthermore, in accordance with some preferred embodiments of the present invention, the orientation of the grating is spiral.

Furthermore, in accordance with some preferred embodiments of the present invention, the orientation of the grating satisfies the relation $\theta(r,\omega)=l\omega/2$, where l is a topological charge, and r, $\omega$ indicate a specific angular position at radius r and angle $\omega$.

Furthermore, in accordance with some preferred embodiments of the present invention, the grating satisfy the relation $\phi_g(r,\omega)=(2\pi r_0/\Lambda_0)(r_0/r)^{l/2-1}$ cos $[(l/2-1)\omega]/[l/2-1]$ for $l\neq 2$, and $\phi_g(r,\omega)=(2\pi r_0/\Lambda_0)\ln(r/r_0)$ for l=2, where $\Lambda_0$ is the local period of the grating.

Furthermore, in accordance with some preferred embodiments of the present invention, there is provided a space variant polarization optical element for spatially manipulating polarization-dependent geometrical phases of an incident light beam, the element comprising a substrate comprising a plurality of zones of gratings with discretely varying orientation, the orientation denoted by $\theta(x,y)$ which is equal to half of a desired geometrical phase (DGP) modulus $2\pi$, each grating with a local period that is substantially smaller than the wavelength of the incident light beam.

Furthermore, in accordance with some preferred embodiments of the present invention, the discretely varying orientation comprises rotated orientation.

Furthermore, in accordance with some preferred embodiments of the present invention, the rotated orientation varies linearly.

Furthermore, in accordance with some preferred embodiments of the present invention, the optical element is used as diffraction grating element, wherein the following equation is maintained $\phi_d=(2\pi/d)x|_{mod\ 2\pi}$, where d is the period of the plurality of zones, and wherein the grating satisfies the relation $\phi_g(x,y)=(2d/\Lambda_0)\sin(\pi x/d)\exp(-\pi y/d)$, where $\Lambda_0$ is the local period of the grating at y=0.

Furthermore, in accordance with some preferred embodiments of the present invention, the orientation of the grating of the zones satisfies the equation $\theta(x)=-\pi x/d|_{mod\ \pi}$, where $\theta(x)$ is the orientation of a grating line at a position x on an axis, and d is the period of the orientation of the grating of the zones.

Furthermore, in accordance with some preferred embodiments of the present invention, the grating in each zone comprise of at least two regions of gratings arranged in different orientations.

Furthermore, in accordance with some preferred embodiments of the present invention, the zones of gratings are arranged in an annular manner.

Furthermore, in accordance with some preferred embodiments of the present invention, the zones of gratings are arranged in a coaxial manner.

Furthermore, in accordance with some preferred embodiments of the present invention, there is provided a method for spatially manipulating polarization-dependent geometrical phases of an incident light beam, the method comprising: providing a substrate comprising a plurality of zones of gratings, with a continuously varying orientation, the orientation denoted by $\theta(x, y)$ which is equal to half of a desired geometrical phase (DGP) modulus $2\pi$, each grating having a local period that is smaller than the wavelength of the incident light beam irradiating the incident light beam onto the substrate.

Furthermore, in accordance with some preferred embodiments of the present invention, there is provided a method for spatially manipulating polarization-dependent geometrical phases of an incident light beam, the method comprising: providing a substrate comprising a plurality of zones of gratings with discretely varying orientation, the orientation denoted by $\theta(x, y)$ that is equal to half of a desired geometrical phase (DGP) modulus $2\pi$, each grating with a local period that is substantially smaller than the wavelength of the incident light beam; irradiating the light beam on the substrate.

Other aspects of the invention will be appreciated and become clear after reading the present specification and reviewing the accompanying drawings.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF PREFERRED EMBODIMENTS

Several embodiments of geometrical phase optical elements with space-variant subwavelength gratings and their implementations thereof are hereby presented, without derogating generality and without limiting the scope of the present invention to these embodiments only.

1. Space-variant Pancharatnam-Berry Phase Optical Elements with Sub-wavelength Gratings:

Space-variant Pancharatnam-Berry phase optical elements based on computer generated subwavelength gratings are presented herein. By continuously controlling the local orientation and period of the grating any desired phase element can be achieved. We present a theoretical analysis, and experimentally demonstrate a Pancharatnam-Berry phase based diffractiortgrating for laser radiation at a wavelength of 10.6 μm.

We consider optical phase elements based on the space-domain Pancharatnam-Berry phase. Unlike diffractive and refractive elements, the phase is not introduced through optical path differences, but results from the geometrical phase that accompanies space-variant polarization manipulation. The elements are polarization dependent, thereby enabling multi-purpose optical elements, suitable for applications such as optical switching, optical interconnects and beam splitting. We show that such elements can be realized using continuous computer-generated space-variant subwavelength dielectric gratings. The continuity of the gratings ensures the continuity of the resulting field thereby eliminating diffraction associated with discontinuities, and enabling the fabrication of elements with high diffraction efficiency. We experimentally demonstrate Pancharatnam-Berry phase diffraction gratings for $CO_2$ laser radiation at a wavelength of 10.6 μm, showing an ability to form complex polarization-dependent continuous phase elements.

Figure 1:
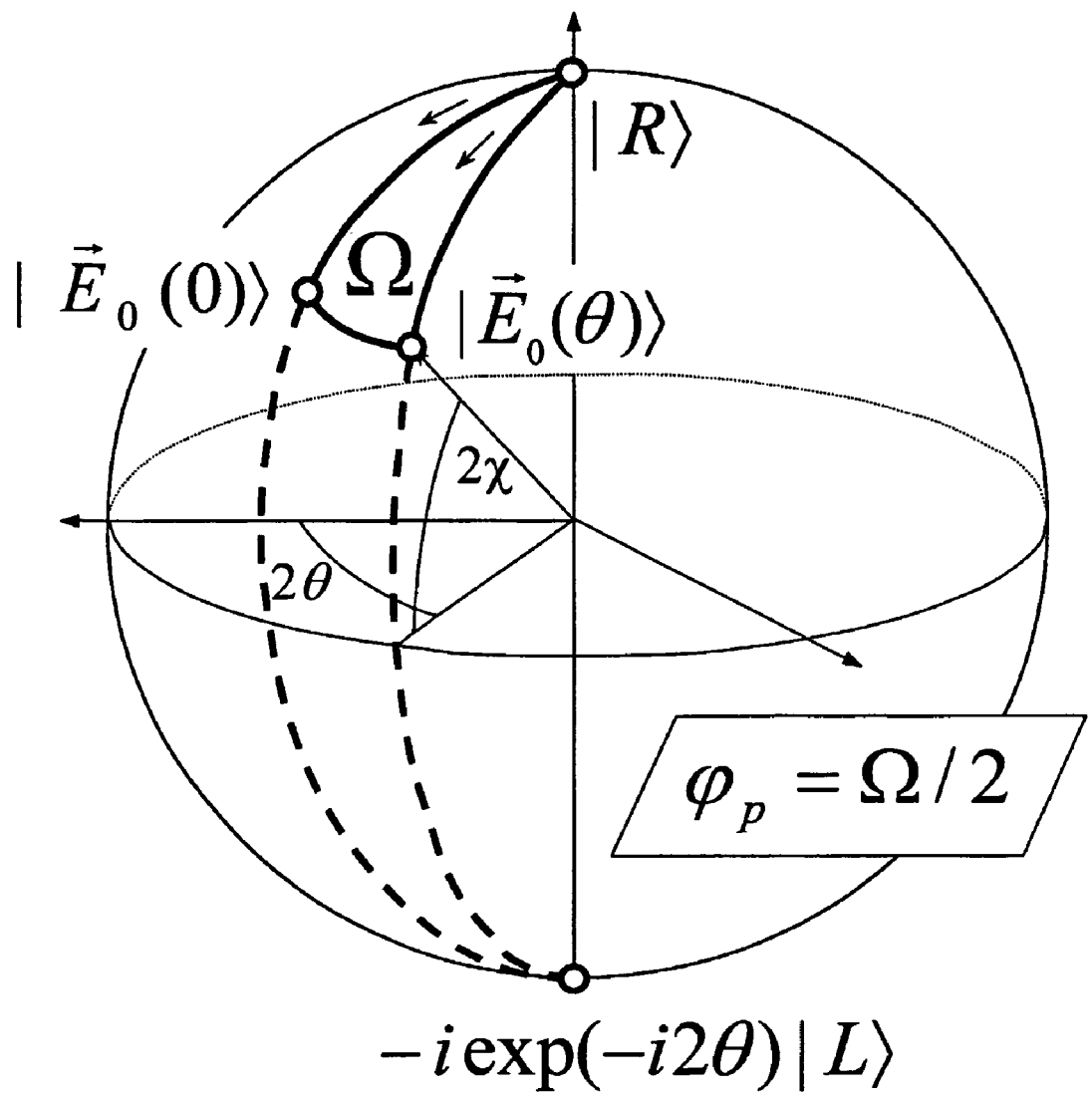
FIG. 1: Illustration of the principle of PBOEs by use of the Poincare sphere.

FIG. 1 illustrates the concept of Pancharatnam-Berry phase optical elements (PBOEs) on the Poincare sphere. Circularly polarized light is incident on a waveplate with constant retardation and a continuously space varying fast axis whose orientation is denoted by $\theta(x,y)$. We will show that since the waveplate is space varying, the beam at different points traverses different paths on the Poincare sphere, resulting in a space-variant phase-front modification originating from the Pancharatnam-Berry phase. Our goal is to utilize this space-variant geometrical phase to form novel optical elements.

It is convenient to describe Pancharatnam-Berry Optical Elements (PBOEs) using Jones calculus. In this formalism, a waveplate with a space-varying fast axis, is described by the operator, $T(x,y)=R(\theta(x,y))J(\phi)R^{-1}(\theta(x,y))$, where $J(\phi)$ is the operator for a waveplate with retardation $\phi$, R is the operator for an optical rotator and $\theta$ is the local orientation of the axis at each point $(x,y)$. For simplicity, we work with the helicity basis in which $|L\rangle$ denotes left-hand circular polarization, and $|R\rangle$ denotes right-hand circular polarization. In this representation, $T(x,y)$ has the explicit form, $$T(x, y) = \cos(\phi/2)\begin{bmatrix} 1 & 0 \\ 0 & 1 \end{bmatrix} - i\sin(\phi/2)\begin{bmatrix} 0 & \exp(i2\theta(x, y)) \\ \exp(-i2\theta(x, y)) & 0 \end{bmatrix}. \quad (1)$$

Thus, if a beam with polarization $E_i$ is incident on $T(x,y)$, the resulting beam has the explicit form, $$E_O=T(x,y)E_i=\cos(\phi/2)E_i-i\sin(\phi/2)[\langle E_i|R\rangle\exp(-i2\theta)|L\rangle+\langle E_i|L\rangle\exp(i2\theta)|R\rangle]. \quad (2)$$

Using Eq. (2) we can calculate the Pancharatnam phase-front of the resulting wave. We define this phase-front based on Pancharatnam's definition for the phase between two beams of different polarization as $\phi_p(x,y)=\arg[\langle E_O(0,0)|E_O(x,y)\rangle]$. This calculation yields that for incident $|R\rangle$ polarization, $\phi_p(x,y)=-\theta+\arctan[\cos\phi\tan\theta]=-\theta+\arctan[\sin(2\chi)\tan\theta]$, where $\chi$ is the ellipticity of the resulting beam. Geometrical calculations show that $\phi_p$ is equal to half the area of the geodesic triangle, $\Omega$ on the Poincare sphere defined by the pole $|R\rangle$, $|E_0(0)\rangle$ and $|E_0(\theta)\rangle$, as illustrated in FIG. 1, yielding the expected Pancharatnam-Berry phase. Similar results can be found for any incident polarization.

Consequently, if a circularly polarized beam is incident on a space-variant polarization-state manipulator, it is subject to geometrical phase modification. Based on Eq. (2), the resulting wave consists of two components, the zero order, and the diffracted order. The zero order has the same polarization as the original wavefront, and does not undergo any phase modification. On the other hand, the diffracted order has a polarization orthogonal to that of the incoming wave, and it's phase at each point is equal to twice the local orientation of the waveplate, $\theta(x,y)$. Since the phase modification of the wavefront is purely geometrical in origin, the phase of the diffracted orders must also be geometrical. We therefore define the Diffractive Geometrical Phase (DGP) as the phase of the diffracted orders when the incident beam is circularly polarized. For incident $|R\rangle$ and $|L\rangle$ polarizations the DGP is equal to $-2\theta(x,y)$ and $2\theta(x,y)$ respectively. By correctly determining the local orientation of the waveplate, any desired DGP can be realized, enabling the realization of phase operators such as lenses or diffraction gratings. Furthermore, since the orientation of the waveplate only varies from 0 to $\pi$, the DGP is defined modulus $2\pi$, and the elements are analogous to diffractive optical elements. However, unlike diffractive optical elements the phase modification in PBOEs does not result from optical path differences, but from polarization-state manipulation, and is intrinsically polarization dependent, with the transmission function given by the matrix $T(x,y)$ as defined in Eq. (2). This equation also shows that the diffraction efficiency of the PBOEs depends on the retardation of the waveplate.

A case of special interest is $\phi=\pi$. In this case, we find that the diffraction efficiency is 100%, and that $|R\rangle$ polarization is completely converted into $|L\rangle$ polarization. However, despite the fact that the resulting polarization is space-invariant, The Pancharatnam phase, $\phi_p=-2\theta(x,y)$, is equal to the DGP. This phase corresponds to half the area encompassed by two geodesic paths between the poles that form an angle of $2\theta$ with one another, as illustrated in FIG. 1. Thus, the DGP is equal to the geometrical Pancharatnam-Berry phase of a PBOE with 100% diffraction efficiency. Note that PBOEs operate in different ways on the two helic polarizations. Consequently, a PBOE lens designed for a wavelength $\lambda$, with focal length $f$, designed by choosing the direction of the waveplate so that $2\theta(x,y)=\pi r^2/\lambda f|_{mod\,2\pi}$, will be a converging lens for $|R\rangle$ polarization, and a diverging lens for $|L\rangle$ polarization.

PBOEs can be realized using space-variant subwavelength gratings. When the period of the grating is much smaller than the incident wavelength, the grating acts as a uniaxial crystal (Z. Bomzon, G. Biener, V. Kleiner and E. Hasman, Opt. Lett. 27, 188 (2002)). Therefore by correctly controlling the depth, structure, and orientation of the grating, the desired PBOE can be made. To design a PBOE, we need to ensure that the direction of the grating stripes, $\theta(x,y)$, is equal to half the desired DGP which we denote as $\phi_d(x,y)$. Next we define a grating vector $K_g=K_0(x,y)[\cos(\phi_d(x,y)/2)\hat{x}+\sin(\phi_d(x,y)/2)\hat{y}]$, where $\hat{x}$ and $\hat{y}$ are unit vectors in the x and y direction, $K_0=2\pi/\Lambda(x,y)$ is the spatial frequency of the grating ($\Lambda$ is the local subwavelength period) and $\phi_d(x,y)/2$ is the space-variant direction of the vector defined so that it is perpendicular to the grating stripes at each point. Next, to ensure the continuity of the grating thereby ensuring the continuity of the resulting optical field, we require $\nabla\times K_g=0$, resulting in a differential equation that can be solved to yield the local grating period. The grating function $\phi_g$ (defined so that $\nabla\phi_g=K_g$) is then found by integrating $K_g$ over an arbitrary path (Z. Bomzon, V. Kleiner and E. Hasman, Opt. Lett. 26, 33 (2001)).

Figure 2:
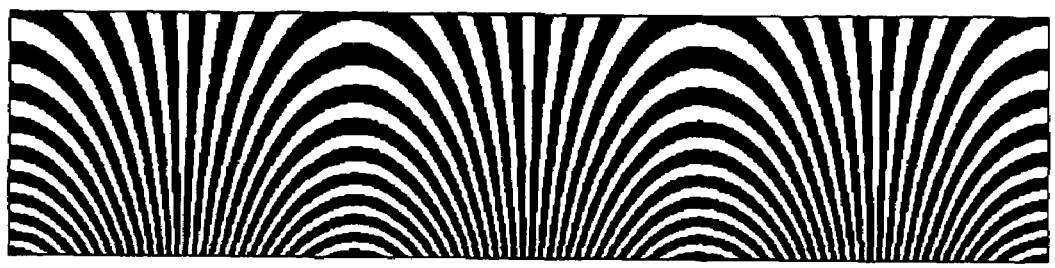
FIG. 2: The geometry of the space-variant subwavelength grating, as well as the Diffractive Geometrical Phase, DGP, for incident |R⟩ and |L⟩ polarizations.
Figure 2:
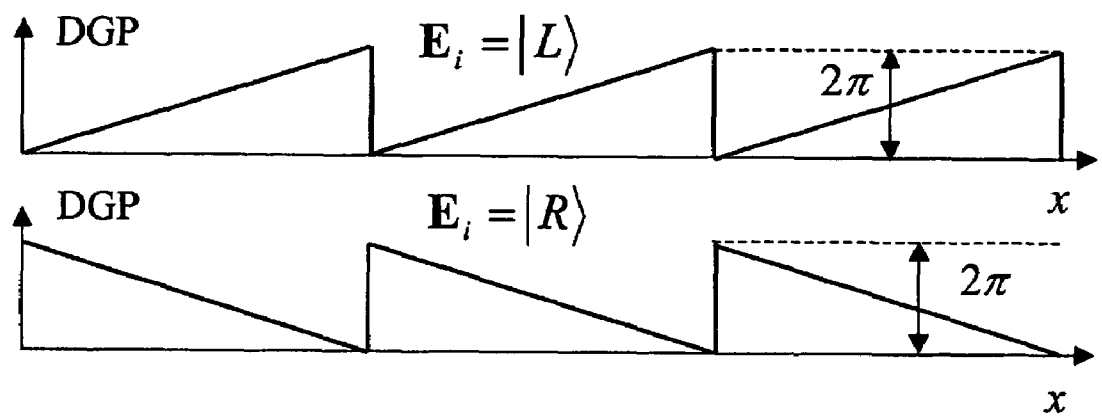

We designed a PBOE that acts as a diffraction grating by requiring that $\phi_d=(2\pi/d)x|_{mod\,2\pi}$, where d is the period of the structure. Applying this to the grating vector and solving the equation $\nabla\times K_g=0$ yields, $K_g=(2\pi/\Lambda_0)\exp(-\pi y/d)[\cos(\pi x/d)\hat{x}-\sin(\pi x/d)\hat{y}]$, where $\Lambda_0$ is the subwavelength period at y=0. The grating function is then found as $\phi_g(x,y)=(2d/\Lambda_0)\sin(\pi x/d)\exp(-\pi y/d)$. We then realized a Lee-type binary grating describing the grating function, $\phi_g$ (Z. Bomzon, V. Kleiner and E. Hasman, Opt. Commun. 192, 169 (2001)). The grating was fabricated for $CO_2$ laser radiation with a wavelength of 10.6 μm, with $\Lambda_0=2$ μm and d=2.5 mm, and consisted of 12 periods of d. We formed the grating with a maximum local subwavelength period of $\Lambda=3.2$ μm because the Wood anomaly occurs at 3.24 μm for GaAs. The grating was realized onto a 500 μm thick GaAs wafer using contact printing photolithography and electron-cyclotron resonance etching with $BCl_3$ to nominal depth of 2.5 μm, to yield a retardation of $\phi=\pi/2$. By combining two such gratings we obtained a grating with retardation $\phi=\pi$. FIG. 2 illustrates the geometry of the grating, as well the DGP for incident $|L\rangle$ and $|R\rangle$ polarization states as calculated from Eq. (2). The DGPs resemble blazed gratings with opposite blazed directions for incident $|L\rangle$ and $|R\rangle$ polarization states, as expected from our previous discussions.

Figure 3:
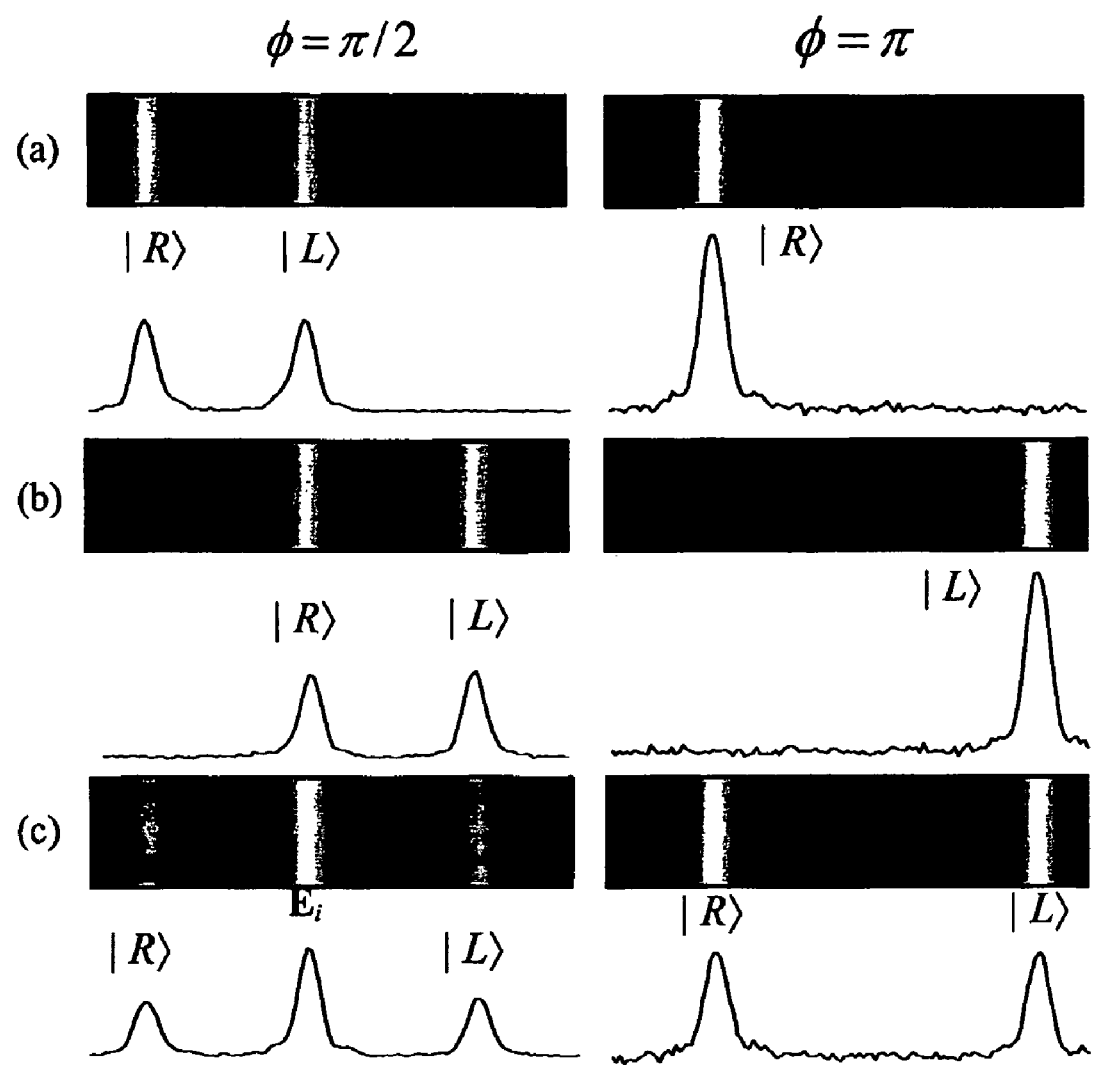
FIG. 3: Measurements of the transmitted far-field for the subwavelength grating PBOE, when the retardation is $\phi=\pi/2$ and $\phi=\pi$ respectively, for incident (a) circular left, (b) circular right and (c) linear polarizations.

Following the fabrication, we illuminated the PBOEs with circular and linear polarization. FIG. 3 shows the experimental images of the diffracted fields for the resulting beams, as well as their cross-sections when the retardation was $\phi=\pi/2$ and $\phi=\pi$ respectively. When the incident polarization is circular, and $\phi=\pi/2$, close to 50% of the light is diffracted according to the DGP into the first order (the direction of diffraction depends on the incident polarization), whilst the other 50% remains undiffracted in the zero order as expected from Eq. (2). The polarization of the diffracted order has switched helicity as expected. For $\phi=\pi$, no energy appears in the zero order, and the diffraction efficiency is close to 100%. When the incident polarization is linear $E_i=1/\sqrt{2}(|R\rangle+|L\rangle)$, the two helic components of the beam are subject to different DGPs of opposite sign, and are diffracted to the first orders in different directions. When $\phi=\pi/2$, the zero order maintains the original polarization, in agreement with Eq. (2), whereas for retardation $\pi$ the diffraction is 100% efficient for both circular polarizations, and no energy is observable in the zero order.

To conclude, we have demonstrated novel polarization-dependent optical elements based on the Pancharatnam-Berry phase. Unlike conventional elements, PBOEs are not based on optical path difference, but on geometrical phase modification resulting from space-variant polarization manipulation.

2. Polarization Beam-splitters and Optical Switches Based on Space-variant Computer Generated Subwavelength Quasi-periodic Structures:

Polarization beam-splitters and optical switches based on subwavelength quasi-periodic structures are presented. By locally controlling the orientation and period of the subwavelength grooves, birefringent elements for which the optical axes vary periodically, are realized. We present a theoretical discussion of these elements, as well as a detailed description of the design and realization procedures. We show experimental results for infra-red radiation at a wavelength of 10.6 µm.

Polarizing beam-splitters are essential components in polarization-based systems such as ellipsometers, magneto-optic data storage and polarization-based light modulators. Often these applications require that the elements provide high extinction ratios over a wide angular bandwidth while maintaining compact and efficient packaging. Conventional polarizing beam-splitters, employing either natural crystal birefringence or polarization-sensitive multilayer structures are usually, either cumbersome or sensitive to angular change, and therefore do not fully meet these requirements.

Contemporary research has begun to address the use of polarization diffraction gratings as beam-splitters and optical switches. Unlike scalar diffraction gratings that are based on periodic modification of phase and amplitude, polarization diffraction gratings introduce a periodic spatial change of the state of polarization leading to polarization-dependent diffraction. Furthermore, the polarization of the diffracted orders is generally different from that of the incident beam. Such a device was demonstrated by Davis et al, who used liquid crystals to create a waveplate with space-varying retardation (J. A. Davis, J. Adachi, C. R. Fernández-Pousa and I. Moreno, Opt. Lett. 26, (2001) 587-589). Alternatively, Gori suggested a grating consisting of a polarizer with a spatially rotating transmission axis (F. Gori, Opt. Lett. 24, (1999) 584-586) and Tervo and Turunen suggested that beam-splitters consisting of spatially rotating wave-plates could be realized using subwavelength gratings (J. Tervo and J. Turunen, Opt. Lett. 25, (2000) 785-786). More recently a polarization diffraction grating based on spatially rotating nematic liquid crystals has been demonstrated (B. Wen, R. G. Petschek and C. Rosenblat, Appl. Opt. 41, (2002) 1246-1250).

Space-variant polarization-state manipulations using computer-generated subwavelength structures were disclosed (Z. Bomzon, V. Kleiner and E. Hasman, Opt. Commun 192, (2001) 169-181, Z. Bomzon, V. Kleiner and E. Hasman, Opt. Lett. 26, (2001) 33-35, and Z. Bomzon, G. Biener, V. Kleiner, E. Hasman, Optics Lett. 27, (2002) 285-287). When the period of a subwavelength periodic structure is smaller than the incident wavelength, only the zeroth order is a propagating order, and all other orders are evanescent. The subwavelength periodic structure behaves as a uniaxial crystal with the optical axes parallel and perpendicular to the subwavelength grooves. Therefore, by fabricating quasi-periodic subwavelength structures, for which the period and orientation of the subwavelength grooves was space-varying, we realized continuously rotating waveplates and polarizers for $CO_2$ laser radiation at a wavelength of 10.6 µm. Furthermore, we showed that such polarization manipulations necessarily led to phase modification of geometrical origin, which left a clear signature on the propagation of the resulting wave. The phase introduced did not result from optical path differences but solely from local changes in polarization and was in-fact a manifestation of the geometrical Pancharatnam-Beny phase (Z. Bomzon, V. Kleiner and E. Hasman, Opt. Lett. 26, (2001) 1424-1426).

Disclosed herein is an experimental demonstration of polarization diffraction gratings based on space-variant computer-generated subwavelength structures. We present a novel interpretation of these elements and show that the polarization-related diffraction is indeed connected to the space-varying Pancharatnam-Berry phase mentioned above. We present experimental results for infra-red $CO_2$ laser radiation that include a polarization diffraction grating based on a space-variant continuous metal-stripe subwavelength structure, a continuously rotating dielectric subwavelength structure and a binary waveplate, for which the direction of the subwavelength grooves varies discretely. We also demonstrate a circular symmetric polarization mode switching based on a computer-generated subwavelength structure, thus enabling alternation between intensity distributions of a bright and dark center.

Figure 4:
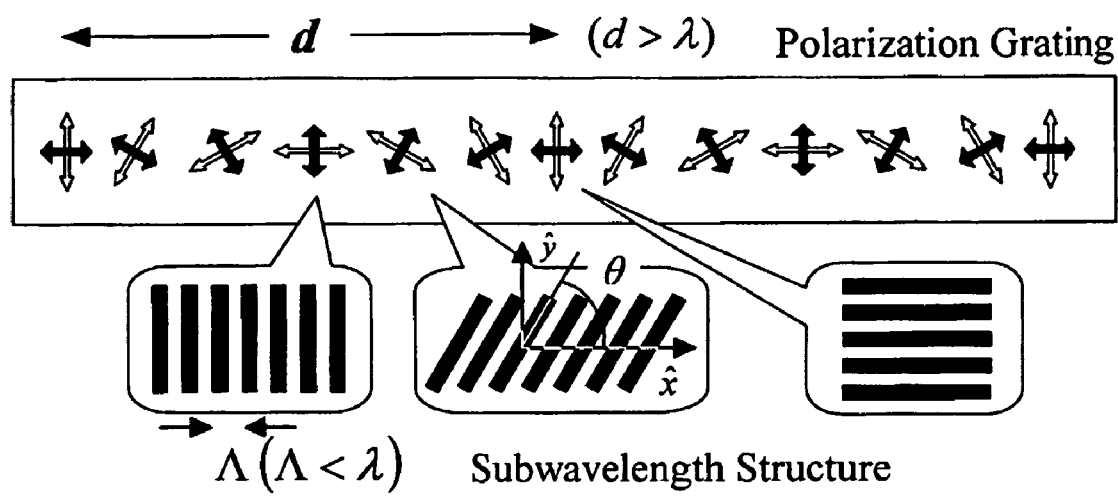
FIG. 4: Illustration of polarization diffraction gratings fabricated using subwavelength quasi-periodic structures. The orientation of the subwavelength grooves, $\theta(x)$, varies periodically in the x-direction, resulting in an element with effective birefringence, whose optical axes (marked by the dark and light arrows in the picture), rotate periodically. The polarization diffraction grating has period d, which is larger than the incident wavelength, $\lambda$, whereas the local subwavelength period is $\Lambda<\lambda$. The local optical axes at each point are oriented parallel and perpendicular to the subwavelength grooves.

FIG. 4 is a schematic representation of the use of a sub-wavelength structure as a polarization diffraction grating. The local orientation of the subwavelength grooves, $\theta(x)$, varies linearly in the x-direction, to form a polarization diffraction grating comprising a birefringent element with optical axes (which are parallel and perpendicular to the grating grooves) that rotate periodically in the x-direction. The period of the polarization diffraction grating, d, is larger than the incident wavelength, $\lambda$, whereas the local subwavelength period of the grooves, $\Lambda(x,y)$, is smaller than the incident wavelength. When a plane-wave with uniform polarization is incident on such a periodic subwavelength structure, the transmitted field will be periodic in both polarization and phase, therefore, we can expect this field to yield discrete diffraction orders in the far-field.

It is convenient to describe subwavelength quasi-periodic structures such as the one depicted in FIG. 4 using Jones Calculus. In this representation, a uniform periodic subwavelength structure the grooves of which are oriented along the y-axis can be described by the Jones matrix, $$J = \begin{pmatrix} t_x & 0 \\ 0 & t_y e^{i\phi} \end{pmatrix}, \quad (1)$$

where $t_x$, $t_y$ are the real amplitude transmission coefficients for light polarized perpendicular and parallel to the optical axes and $\phi$ is the retardation of the grating. If the orientation of the subwavelength grooves is space-varying, i.e. different at each location, then the subwavelength structure can be described by the space-dependent matrix, $$T_C(x) = M(\theta(x)) J M^{-1}(\theta(x)), \quad (2)$$

where $\theta(x)$ is the local orientation of the optical axis and $$M(\theta) = \begin{pmatrix} \cos\theta & -\sin\theta \\ \sin\theta & \cos\theta \end{pmatrix}$$

is a two-dimensional rotation matrix.

For convenience we adopt the Dirac bra-ket notation, and convert $T_C(x)$ to the helicity base in which $$|R\rangle = \begin{pmatrix} 1 \\ 0 \end{pmatrix} \text{ and } |L\rangle = \begin{pmatrix} 0 \\ 1 \end{pmatrix}$$

are the two-dimensional unit vectors for right-hand and left-hand circularly polarized light. In this base, the space-variant polarization operator is described by the matrix, $T(x) = UT_CU^{-1}$, where $$U = \frac{1}{\sqrt{2}} \begin{pmatrix} 1 & 1 \\ -i & i \end{pmatrix}$$

is a unitary conversion matrix. Explicit calculation of $T(x)$ yields, $$T(x) = \quad (3)$$
$$\frac{1}{2}(t_x + t_y e^{i\phi}) \begin{pmatrix} 1 & 0 \\ 0 & 1 \end{pmatrix} + \frac{1}{2}(t_x - t_y e^{i\phi}) \begin{pmatrix} 0 & \exp[i2\theta(x)] \\ \exp[-i2\theta(x)] & 0 \end{pmatrix},$$

Thus for an incident plane-wave with arbitrary polarization $|E_{in}\rangle$ we find that the resulting field is, $$|E_{out}\rangle = \sqrt{\eta_E} |E_{in}\rangle + \sqrt{\eta_R} e^{i2\theta(x,y)} |R\rangle + \sqrt{\eta_L} e^{-i2\theta(x,y)} |L\rangle, \quad (4)$$

where $\eta_E = \left|\frac{1}{2}(t_x + t_y e^{i\phi})\right|^2$, $\eta_R = \left|\frac{1}{2}(t_x - t_y e^{i\phi})\langle E_{in} | L\rangle\right|^2$, $\eta_L = \left|\frac{1}{2}(t_x - t_y e^{i\phi})\langle E_{in} | R\rangle\right|^2$, are the polarization order coupling efficiencies and $\langle \alpha | \beta \rangle$ denotes inner product.

Figure 5:
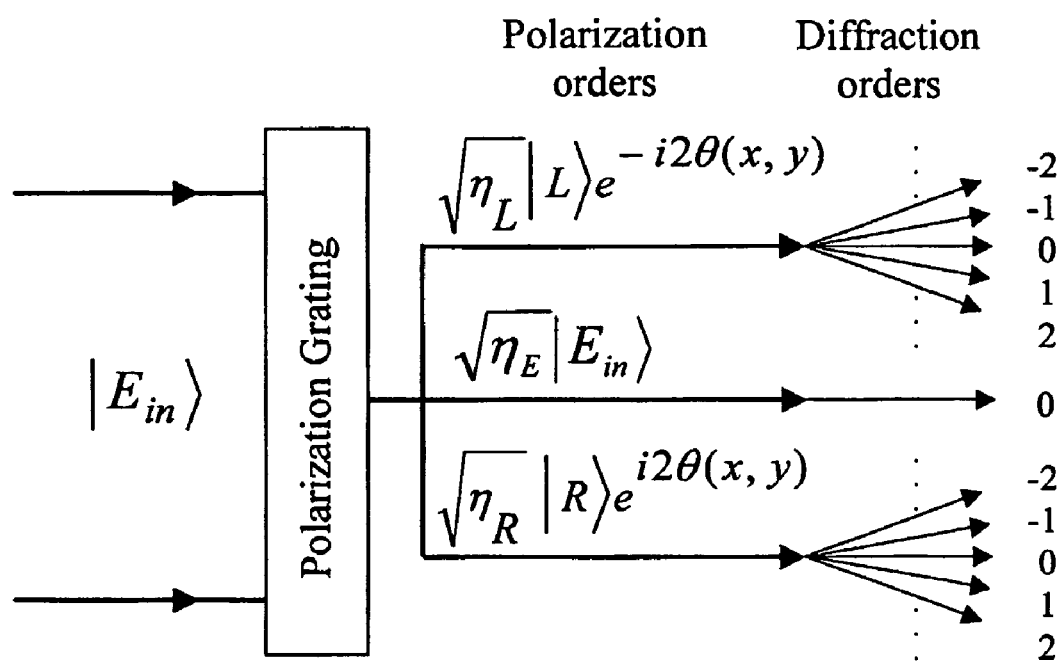
FIG. 5: A diagram describing the operation of polarization diffraction gratings. A beam with polarization |E$_{in}$⟩ is incident on the polarization grating. The resulting beam comprises three polarization orders, EPO(E Polarizing Order), which maintains the original polarization and does not undergo phase modification. The RPO (Right Polarizing Order) that is |R⟩ polarized, and whose phase is modified by $2\theta(x)$, and LPO (Left Polarizing Order) that is |L⟩ polarized, and whose phase is modified by $-2\theta(x)$. Since $\theta(x)$ is periodic, the RPO and the LPO undergo diffraction, resulting in the appearance of discrete diffraction orders.

FIG. 5 is a graphic representation of the results of Eq. (4). It shows that $|E_{out}\rangle$ comprises three polarization orders; the $|E_{in}\rangle$ polarization order (EPO), the $|R\rangle$ polarization order (RPO) and the $|L\rangle$ polarization order (LPO). The EPO maintains the polarization and phase of the incident beam, whereas the phase of the RPO is equal to $2\eta(x)$, and the phase of the LPO is equal to $-2\theta(x)$. We note that the phase modification of the $|R\rangle$ and the $|L\rangle$ polarization orders results solely from local changes in polarization and is therefore geometrical in nature. We therefore denote this phase as the Diffractive Geometrical Phase (DGP) (Z. Bomzon, G. Biener, V. Keiner and E. Hasman, "Space-variant Pancharatnam Berry phase optical elements with computer-generated subwavelength gratings", Opt. Lett, in press, (2002)).

The DGP for the $|R\rangle$ polarization order is opposite in sign to that of the $|L\rangle$ polarization order, and if $\theta(x)$ is periodic, the functions $e^{i2\theta(x)}$ and $e^{-i2\theta(x)}$ that appear in Eq. (4) can be developed into Fourier series. Taking into account the connection between the Fourier series of a function and the Fourier series of its complex conjugate, this leads to the equation, $$|E_{out}\rangle = \quad (5)$$
$$\sqrt{\eta_0} |E_{in}\rangle + \sqrt{\eta_R} \sum_{m=-\infty}^{\infty} a_m e^{i2\pi nx/d} |R\rangle + \sqrt{\eta_L} \sum_{m=-\infty}^{\infty} a^*_{-m} e^{i2\pi nx/d} |L\rangle,$$

where $a_m = \frac{1}{2\pi} \int e^{i2\theta(x)} e^{i2\pi nx/d} dx$.

Thus we find that the diffraction efficiency into the $m^{th}$ order of the RPO ($\eta_m^R = |a_m|^2$), is equal to the diffraction efficiency into the $-m^{th}$ order of the LPO ($\eta_{-m}^L = |a_m'|^2$), and conclude that the RPO and LPO are diffracted in opposite senses.

Based on Eqs. (4-5) we find that there are three degrees of freedom associated with the design of polarization diffraction gratings. The first degree of freedom is the determination of the subwavelength structure parameters, $t_x$, $t_y$ and $\phi$. These parameters determine the amount of energy coupled into the EPO. The second degree of freedom is the grating orientation $\theta(x)$. $\theta(x)$ that determines the DGP, thereby determining the diffraction efficiency into all diffraction orders. The third degree of freedom is the incident polarization $|E_{in}\rangle$. It determines the ratio between the energy in the RPO and the energy in the LPO. In the next paragraphs, we intend to demonstrate how these three degrees of freedom can be utilized for the design and realization of polarization beam-splitters and optical switches using subwavelength quasi-periodic structures.

Supposing we wish to design a blazed polarization diffraction grating, i.e. a grating for which all the diffracted energy is in the $1^{st}$ order when the incident beam is $|R\rangle$ polarized. For $|E_{in}\rangle = |R\rangle$ we find that $\eta_R = 0$. Consequently the transmitted beam only consists of the LPO and the EPO. Since the EPO does not undergo any phase modification, all of its energy is located in the zero order, and the only order that contributes energy to the $1^{st}$ order is the LPO. In order to ensure that all the energy of the LPO will be diffracted into the $1^{st}$ order, it is required that the DGP for the LPO be equal to $2\pi x/d|_{mod\,2\pi}$. Consequently, we find that $\theta(x) = -\pi x/d|_{mod\,\pi}$. Next, in order to ensure that no energy is found in the zero-order, we require that $\eta_E = 0$. This condition leads to the solution $t_x = t_y$ and $\phi = \pi$. Thus by determining the incident polarization, $|E_{in}\rangle$, the grating orientation, $\theta(x)$, and the grating parameters $t_x = t_y$ and $\phi = \pi$, we are able to create the desired diffraction pattern.

In addition, we note that for such a grating, the DGP for the RPO is $2\theta(x)=-2\pi x/d|_{mod\ 2\pi}$, and therefore if $|E_{in}\rangle=|L\rangle$, the grating is blazed in the opposite direction. Thus for arbitrary incident polarization, the diffracted energy will be distributed between the $1^{st}$ and $-1^{st}$ orders. The distribution is dependent on the polarization of the incident beam. Furthermore, the polarization in the $1^{st}$ order will always be $|L\rangle$, and the polarization in the $-1^{st}$ order will always be $|R\rangle$. Thus, by switching the incident polarization between an $|L\rangle$ state and an $|R\rangle$ state, an optical switch can be realized. Furthermore, if we choose $\phi\neq\pi$, then some of the incident energy will be coupled into the EPO, resulting in the appearance of a zero-order that maintains the polarization of the incident beam, thereby demonstrating the usefulness of such a device as a variable polarization-dependent beam splitter.

We now focus our attention on the design of the blazed grating discussed above using a quasi-periodic subwavelength structure. Since the determination of the grating parameters $t_x$, $t_y$ and $\phi$ depend mainly on the subwavelength groove profile, and not on the subwavelength groove orientation, we begin by determining the desired subwavelength groove orientation, $\theta(x)$, and period, $\Lambda(x,y)$, for the subwavelength structure with the desired DGP. The grating parameters $t_x$, $t_y$ and $\phi$ are later determined by choosing a fabrication process that yields a grating profile with the desired birefringence.

To design a continuous subwavelength structure with the desired DGP, we define a subwavelength grating vector, $K_g(x,y)$, oriented perpendicular to the desired subwavelength grooves, $$K_g(x,y)=K_0(x,y)\cos(\pi x/d)\hat{x}-K_0(x,y)\sin(\pi x/d)\hat{y}. \quad (6)$$

$K_0(x,y)=2\pi/\Lambda(x,y)$ is yet to be determined as the local spatial frequency of the subwavelength structure. FIG. 6(c) illustrates this definition of $K_g(x,y)$. To ensure the continuity of the subwavelength grooves, we require that $\nabla\times K_g=0$, leading to the partial differential equation, $$\frac{\partial K_o}{\partial y}\cos(\pi x/d)+\frac{\partial K_o}{\partial x}\sin(\pi x/d)+\frac{\pi}{d}K_0\cos(\pi x/d)=0, \quad (7)$$

with the boundary condition $K_0(x,0)=2\pi/\Lambda_0$, where $\Lambda_0$ is the local subwavelength period at $y=0$. The solution to this problem is given by, $$K_g(x,y)=\frac{2\pi}{\Lambda_0}\exp(-\pi y/d)[\cos(\pi x/d)\hat{x}-\sin(\pi x/d)\hat{y}]. \quad (8)$$

Consequently, the grating function is then found by integrating $K_g$ over an arbitrary path to yield, $$\phi_g(x,y)=\frac{2d}{\Lambda_0}\sin(\pi x/d)\exp(-\pi y/d) \quad (9)$$

Figure 6:
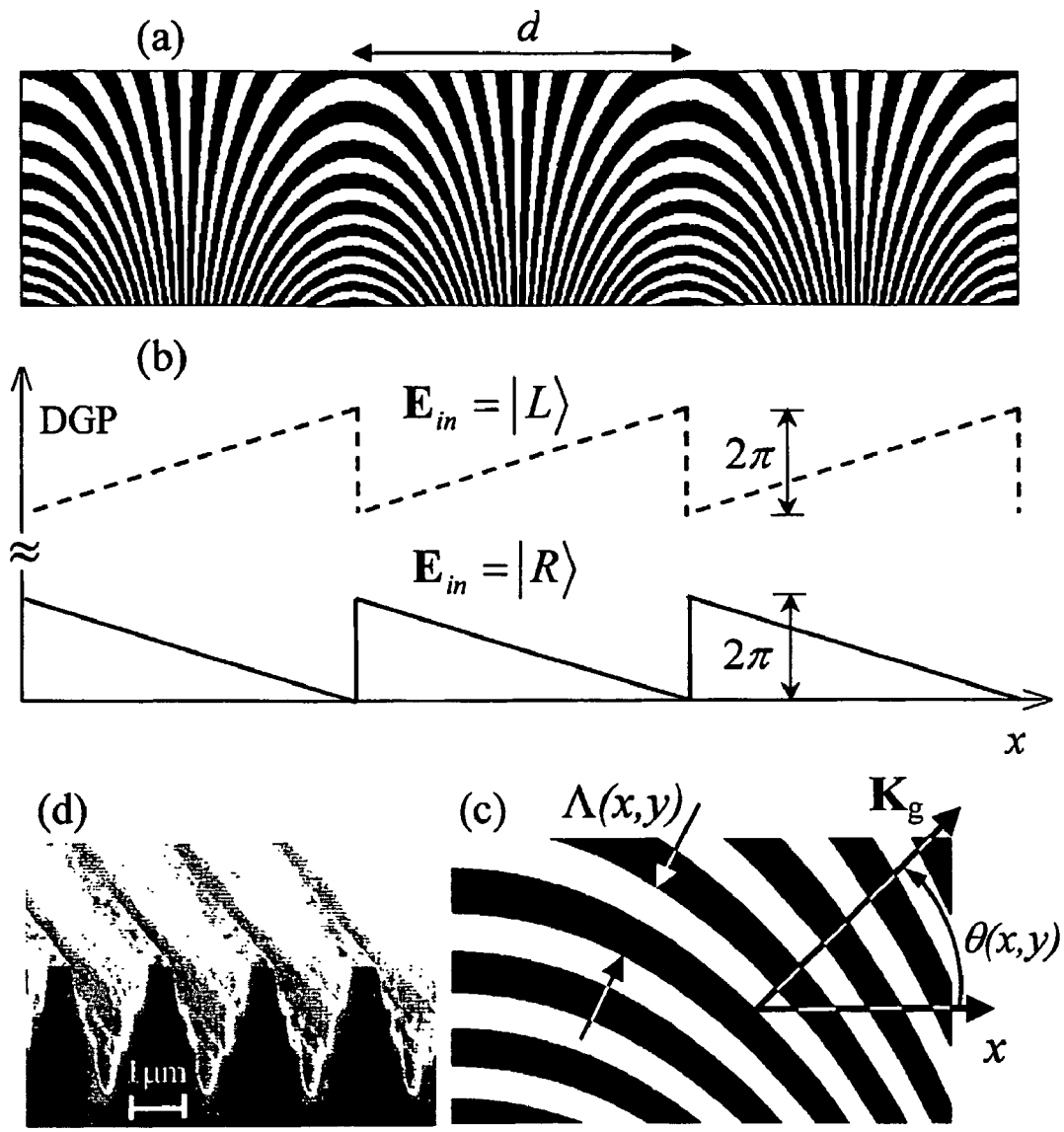
FIG. 6: (a) The magnified geometric representation of the continuous blazed polarization diffraction grating; (b) the resulting DGPs for RPO and LPO formed by this structure. (c) shows a magnified image of a region on the subwavelength structure, demonstrating the local subwavelength period $\Lambda(x, y)$, the local subwavelength groove orientation $\theta(x,y)$, and the local subwavelength grating vector $K_g$. (d) Scanning electron microscope image of the GaAs dielectric structure.

We realized a Lee-type binary subwavelength structure mask (see W. H. Lee, Appl. Optics 13, (1974) 1677-1682) described by the grating function of Eq. (9) using high-resolution laser lithography. The amplitude transmission for such a Lee-type binary mask can be derived as, $$t(x,y)=U_s[\cos(\phi_h)-\cos(\pi q)], \quad (10)$$

where $U_s$ is the unit step function defined by, $$U_s(\eta)=\begin{cases} 1, & \eta\geq 0 \\ 0, & \eta<0 \end{cases},$$

and where q is the duty cycle of the grating which was chosen as 0.5. FIG. 6 illustrates the geometry of a Lee-type binary subwavelength, as well as the resulting DGPs for the RPO and the LPO formed by this structure. The figure shows a continuous quasi-periodic subwavelength structure with a local subwavelength period $\Lambda(x,y)$ where at each location on the element, the grooves are oriented perpendicular to the required fast-axis, resulting in the desired polarization diffraction grating. The resulting DGPs resemble the phase function of a scalar blazed grating. The RPO is blazed in the opposite direction of the LPO as discussed above. Hence, incident $|R\rangle$ polarization is diffracted in the opposite direction of incident $|L\rangle$ polarization. The local subwavelength periodicity gives the structure its birefringence, whilst the continuity of the subwavelength grooves ensures the continuity of the resulting field. Furthermore, we note the space-varying nature of $\Lambda(x,y)$. This is a necessary result for the requirement of continuity posed on the subwavelength grooves.

We realized three different subwavelength structures with the geometry shown in FIG. 6. The first element was realized as a metal stripe subwavelength structure using contact photolithography and lift-off, and the other two elements were dielectric gratings realized using contact photolithography and dry etching techniques. The elements were realized for $CO_2$ laser radiation at a wavelength of 10.6 µm on 500 µm thick GaAs wafers. We fabricated the gratings with $\Lambda_0=2$ µm, and d=2.5 mm, consisting of 12 periods of d. The gratings were formed with maximum local subwavelength period of $\Lambda=3.2$ µm because the Wood anomaly occurs at 3.24 µm for GaAs. The metal stripes consisted of a 10 nm adhesion layer of Ti and 60 nm Au with a duty cycle of 0.6 yielding measured values of $t_x=0.6$, $t_y=0.2$, and $\phi=0.6\pi$. The dielectric gratings were fabricated using electron-cyclotron resonance etching with $BCl_3$ to nominal depth of 2.5 µm and duty cycle of 0.5, resulting in measured values of a retardation $\phi=\pi/2$, and $t_x=t_y=0.9$. By combining two such gratings, we obtained a grating with retardation $\phi=\pi$, and $t_x=t_y=0.89$. These values are close to the theoretical predictions achieved using rigorous coupled wave analysis (M. G. Moharam and T. K. Gaylord, J. Opt. Soc. Am. A 3, (1986) 1780-1787). FIG. 6(d) shows a scanning electron microscope image of one of the dielectric structures. We note the local periodicity of the structure and the clear profile of the subwavelength grooves.

Figure 7:
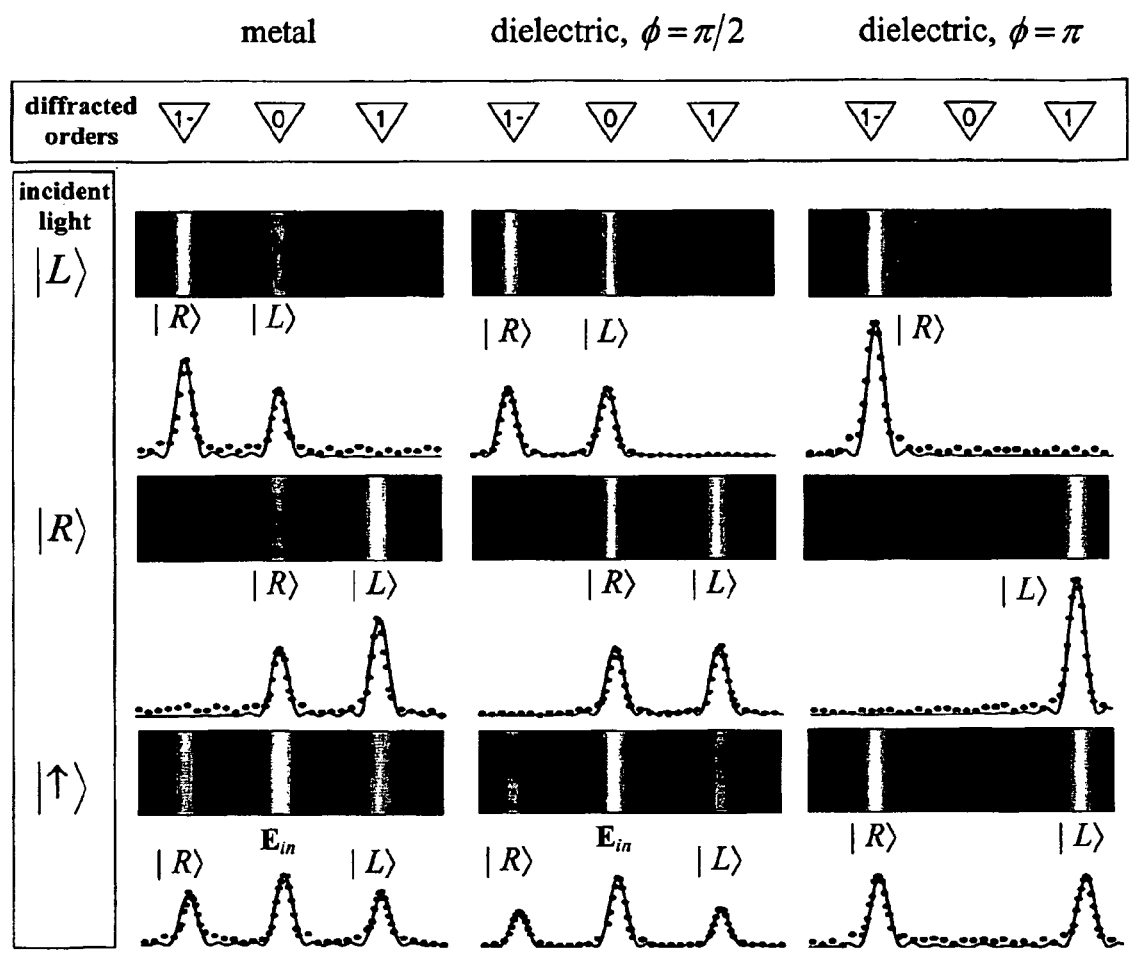
FIG. 7: Images and experimental (dots) and calculated cross-section (solid curves) of the far-field of the beam transmitted through the blazed polarization diffraction gratings, when the incident beam has |L⟩ polarization, when the incident beam has |R⟩ polarization, and when the incident beam has linear polarization, |↑⟩.

Following the fabrication we illuminated the structures with polarized light. FIG. 7 shows images of the far-field intensity distributions of the transmitted beams, as well the measured and predicted intensity cross-sections for incident $|R\rangle$ polarization, for incident $|L\rangle$ polarization and for incident linear polarization ($|E_{in}\rangle=|\uparrow\rangle$) There is a good agreement between experiment and theory, which was calculated using Eq. (4), and far-field Fraunhoffer intensities. For incident $|R\rangle$ polarization only the zero order and the $1^{st}$ order appear. The zero order is due to the EPO, and maintains the polarization of the incident beam, whereas the $1^{st}$ order is derived from the LPO and has $|L\rangle$ polarization. For incident $|L\rangle$ polarization, the zero-order and the $-1^{st}$ order appear, and the polarization of the $-1^{st}$ order is $|R\rangle$. In the case of incident linear polarization, we note the linear polarization of the zero order, the $|L\rangle$ polarization of the $1^{st}$ order and the $|R\rangle$ polarization of the $-1^{st}$ order as discussed above. We note that for the grating in which $t_x=t_y=0.89$ and $\phi=\pi$, $\eta_E=0$, consequently, all of the energy is diffracted into the $1^{st}$ and $-1^{st}$ orders, as expected.

Figure 8:
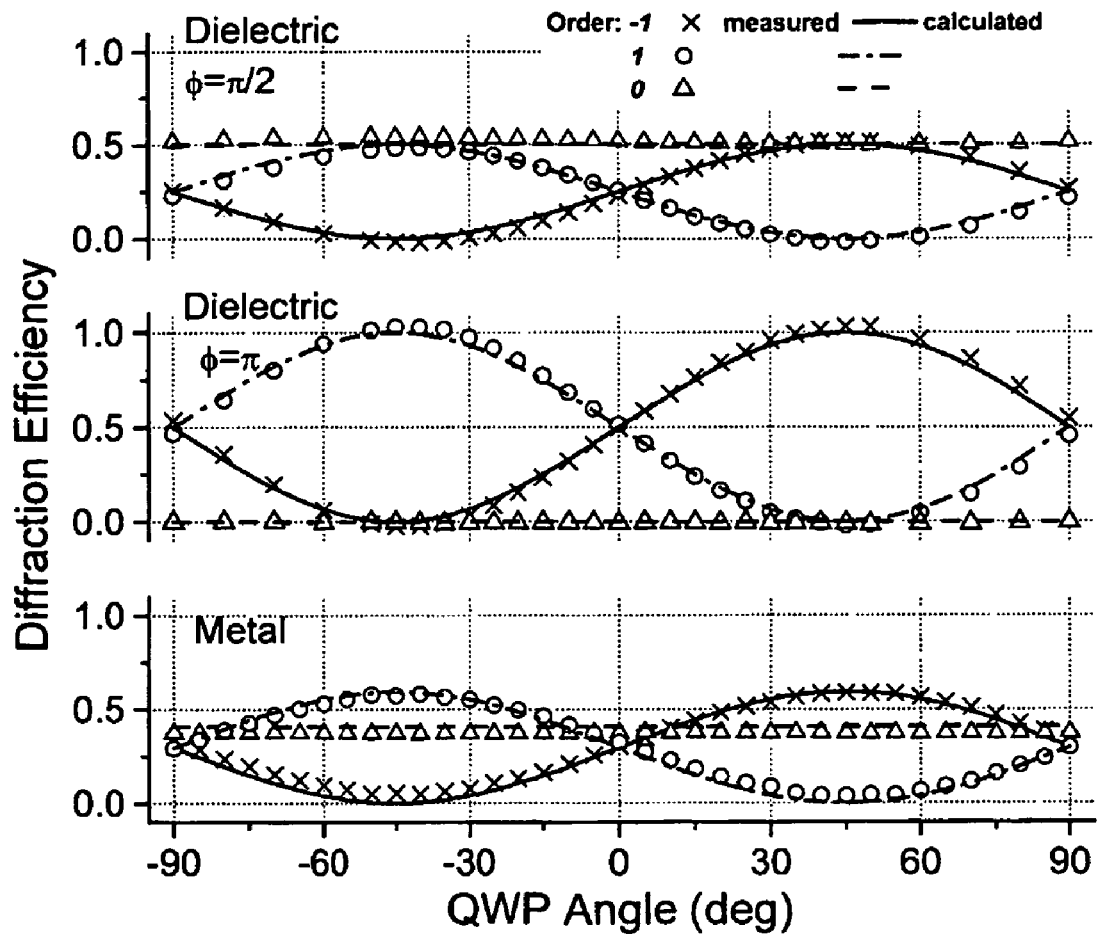
FIG. 8: Measurements and predicted diffraction efficiencies in the $1^{st}$, $-1^{st}$ and 0 orders of the metal-stripe and dielectric blazed polarization gratings for various incident polarizations. The different incident polarization were achieved by rotating a quarter waveplate (QWP) in front of the linearly polarized light emitted from the $CO_2$ laser. The graphs show the efficiencies as a function of the orientation of the QWP. The efficiencies are normalized relative to the total transmitted intensity for each grating.

FIG. 8 shows the predicted and measured diffraction efficiencies for the three blazed polarization diffraction gratings for various incident polarization states. The diffraction efficiencies are normalized relative to the total transmitted intensity. The different polarization-states were achieved by rotating a quarter wave-plate in front of the linearly polarized light emitted from the laser. The experiments agree with the predictions. The diffraction efficiency in the zero-order is equal to $\eta_E$. It has a different value for each of the grating, however, for each grating, it remains constant regardless of the incident polarization. On the other hand, the diffraction into the $1^{st}$ and $-1^{st}$ orders depends on the incident polarization, illustrating the usefulness of polarization diffraction gratings as variable polarization beam-splitters and light modulators.

To further examine the use of polarization diffraction gratings as beam splitters and optical switches, we fabricated a binary polarization diffraction grating using a subwavelength dielectric structure. Each period, d, (d>λ), of the grating is comprised of two regions. The subwavelength grating vector in the first region pointed along the x-axis, and the subwavelength grating vector in the second region pointed along the y-axis. i.e, $$\theta(x) = \begin{cases} 0 & 0 < x < d/2 \\ \pi/2 & d/2 < x < d \end{cases}. \quad (11)$$

Figure 9:
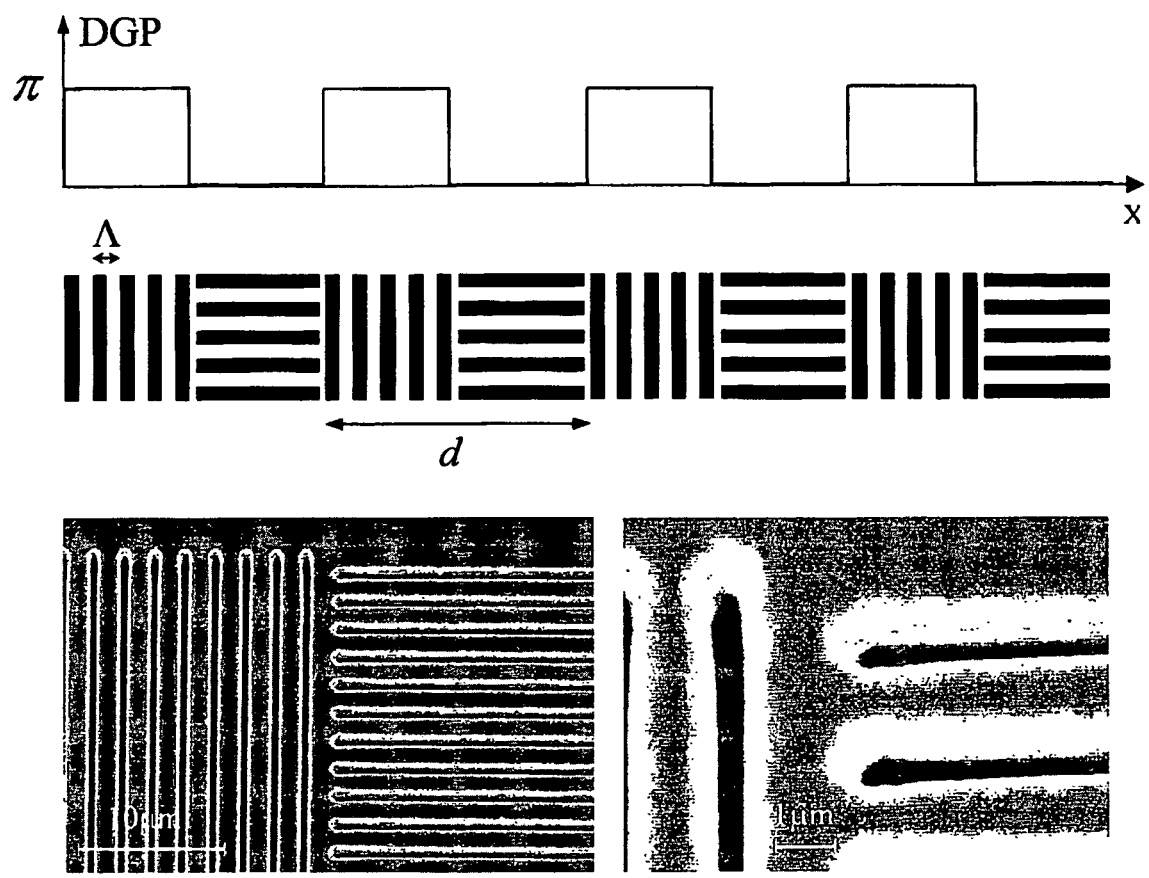
FIG. 9: geometric representation of the subwavelength structure of the binary polarization diffraction grtaing (middle), as well as the DGP that results from this structure (top). The pictures (bottom) are Scanning Electron Microscope images of the dielectric subwavelength structure.

We fabricated the subwavelength structure on a GaAs wafer with $t_x=0.95$, $t_y=0.84$, and $\phi=0.45\pi$. The structure was fabricated with d=200 μm and Λ(x,y)=2 μm. FIG. 9 shows a schematic representation of the subwavelength structure, a graph depicting the resulting DGP and scanning electron microscope images of the subwavelength structure which we had fabricated. We note that the DGP is the same for both the RPO and the LPO. It resembles a scalar binary π-phase grating. Consequently the diffraction efficiencies for both the RPO and the LPO, will be the same as those of a scalar binary π-phase grating (E. Hasman, N. Davidson, and A. A. Friesem, Opt. Lett. 16, (1991) 423-425), i.e., $$\eta_m^R = \eta_m^L = \frac{4\sin^2(m\pi/2)}{(m\pi)^2}. \quad (12)$$

Note that for a binary π-phase grating only the odd orders appear and consequently $\eta_0^L=\eta_0^R=0$. Furthermore, Eq. (12) yields that $\eta_1^{L,R}=\eta_{-1}^{L,R}=0.405$, and $\eta_3^{L,R}=\eta_{-3}^{L,R}=0.045$.

Figure 10:
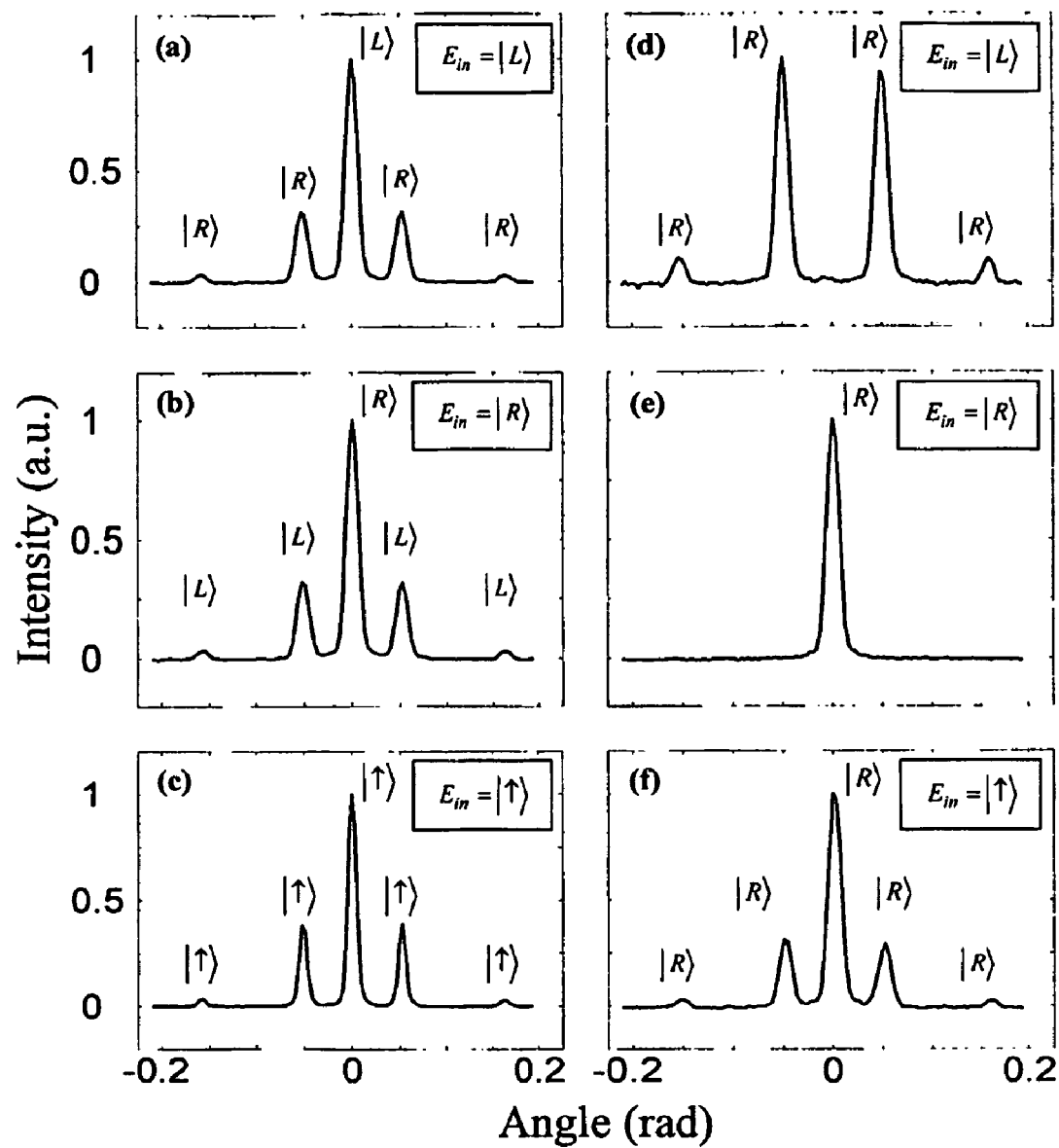
FIG. 10: Measured intensity and polarization in the various diffraction orders of the binary polarization diffraction grating for incident (a) |L⟩ polarization, (b) incident |R⟩ polarization and (c) incident |↑⟩ polarization, as well as the intensity transmitted through a combination of the binary diffraction grating and a circular polarizer oriented to transmit |R⟩ polarization for (d) incident |L⟩ polarization (e) incident |R⟩ polarization and (f) incident |↑⟩ polarization. The intensities are normalized so that the maximum intensity in each graph is equal to 1.

FIG. 10 shows the measured diffraction efficiencies when the incident beam has (FIGS. 7(a,b)) circular and (FIG. 10(c)) linear polarization, as well as the efficiency when the transmitted beam has passed through a circular polarizer oriented to transmit |R⟩ polarized light (FIGS. 10(d-f)). We note that when the beam does not pass through a circular polarizer, the intensity in the various diffracted orders is not dependent upon the incident polarization, however the polarization-state of the diffracted orders does depend on the incident polarization. We note that the intensity of the diffracted orders on the right is equal to the intensity of the diffracted orders on the left, indicative of symmetrical phase structure of the DGP. Furthermore the ratio between the intensity in the $1^{st}$ and $3^{rd}$ orders is $\eta_1/\eta_3 \approx 9$, in agreement with Eq. (12), providing further verification of the binary π-phase of the DGP. In addition, for incident |R⟩ polarization, the experimental ratio between the intensities in the zero order and in the $1^{st}$ order is 3.376. This agrees with the predicted ratio of $\eta_E/(\eta_L\eta_1^L)= [|t_{x+y}e^{i\Phi}|^2/0.405|t_x-t_ye^{\Phi}|^2]$, as predicted using Eqs. (4, 12). When a circular polarizer, oriented to transmit only |R⟩ polarized light is applied to the beam, we notice that for incident |R⟩ polarization (FIG. 10(e)) only the zero order appears. (this is because $\eta_R=0$). For incident |L⟩ polarization (FIG. 10(d)) only the orders other than the zero order appear (this is because the EPO has |L⟩ polarization), 5 and for incident linear polarization (FIG. 10(f)) all diffracted orders appear (this is due all three orders being linearly polarized). Thus, by placing a polarization modulator such as a liquid crystal cell in front of a setup, comprising a polarization-diffraction grating and a circular polarizer, an optical switch could be assembled for applications such as optical interconnections in communications.

Until now we have discussed polarization beam splitting and optical switching by use of polarization diffraction gratings. However, sometimes a different geometry is required. Suppose for instance, we wish to create an optical switch that enables switching between an optical circularly symmetric mode with a bright center, and an optical circularly symmetric mode with a dark center. This can be done with a quasi-periodic subwavelength structure for which, $\theta(x,y)=\omega(x,y)+c$, where $\omega=\arctan(y/x)$ is the azimuthal angle, and c is a constant number. The DGP of the RPO for such an element is equal to $2(\omega(x,y)+c)$. Thus the RPO carries a vortex with a topological charge of 2 (D. Rozas, C. T. Law and G. A. Swartzlander Jr., J. Opt. Soc. Am. B. 14, (1997) 3054-3065), and therefore it has a dark center. Furthermore, since the EPO does not undergo any phase modification, its topological charge is zero, and it exhibits a bright center. Therefore, if we design a quasi-periodic subwavelength structure with $\theta(x,y)=\omega(x,y)+c$, choose $\phi \neq \pi$, and illuminate it with |L⟩ polarization, the resulting beam will comprise an |R⟩ polarized vortex carrying beam with a dark center and an |L⟩ polarized beam with a bright center. We can switch between the two modes using a circular polarizer.

Figure 11:
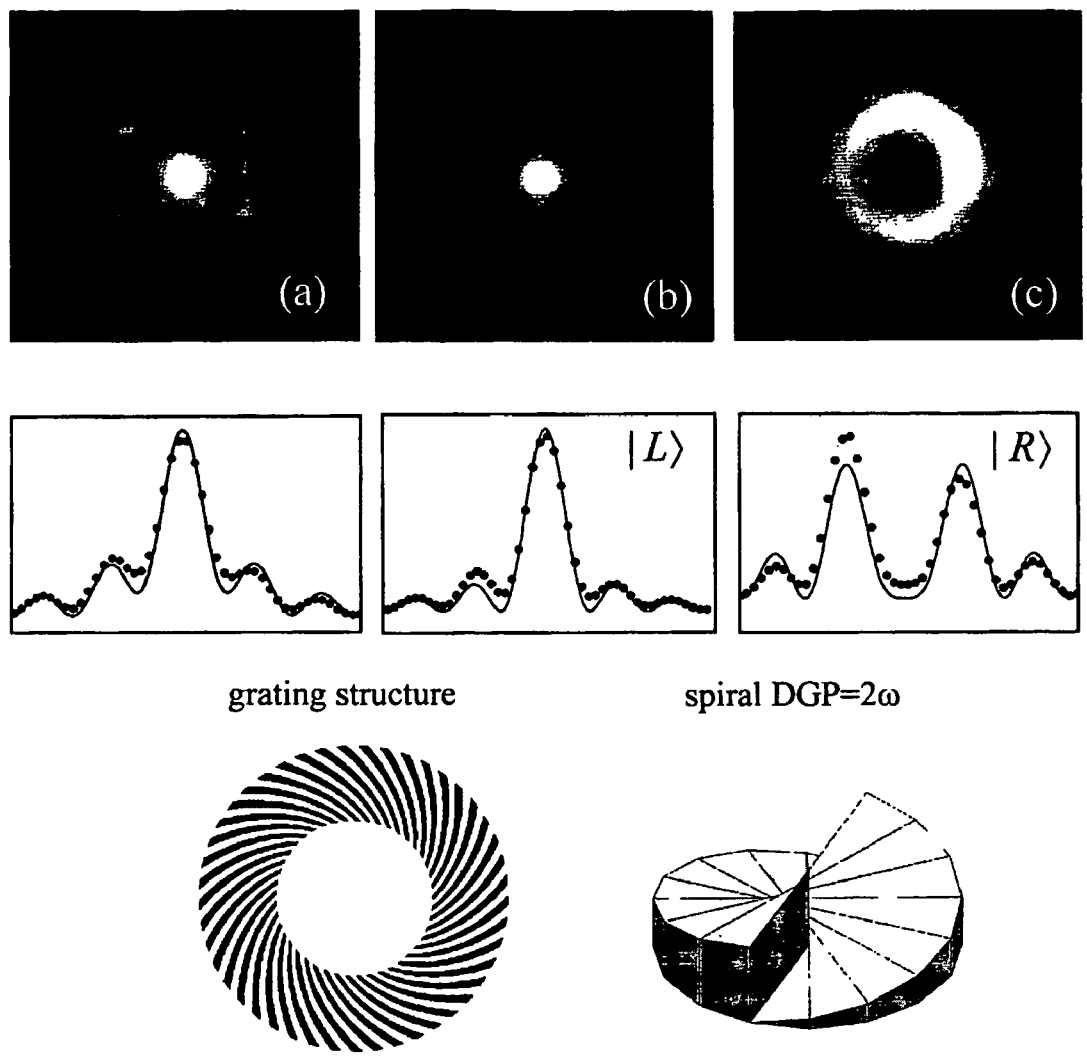
FIG. 11: The far-field images and calculated and measured cross-sections of the beam transmitted through the circular symmetric polarization mode switching, (a) when the incident polarization is |L⟩, as well as (b) the image and cross-sections of the transmitted |L⟩ component, and (c) the image and cross sections of the transmitted |R⟩ component. Also shown, (bottom), the geometry of the subwavelength quasi-periodic structure as well as the spiral DGP caused by this element.

We realized such a quasi-periodic subwavelength structure on a GaAs wafer, with $\theta(x,y)=\omega(x,y)+\pi/4$, yielding a grating function $\phi_g=(2\pi r_0/\sqrt{2}\Lambda_0)[\ln(r/r_0)-\omega]$, where r is a radial coordinate. We chose $\Lambda_0=2$ μm and $r_0=5$ mm, so that 5 mm<r<8 mm and 2 μm<Λ<3.2 μm, and fabricated a dielectric grating with retardation of $\phi=$ or π/2. Note that for incident |L⟩ polarization, the transmitted beam had radial polarization in the near field, and that for incident |R⟩ polarization, the near field had azimuthal polarization. FIG. 11 shows far-field images and the measured and calculated cross-sections of (a) the transmitted beam when the incident polarization is |L⟩ as well as the far-field image of the (b) |L⟩ and (c) |R⟩ components of the beam as obtained with a circular polarizer. FIG. 11 also shows the geometry of the subwavelength quasi-periodic structure as well as the DGP caused by this element. We note the clear vortex in the DGP. The dark center of the vortex is evident in the measured results where we note that the |L⟩ component of the transmitted beam (the EPO), has a bright center without undergoing any phase modification, whereas the |R⟩ component (RPO) has a dark center, clearly indicative of its topological charge. The results clearly demonstrate the circularly symmetric mode switching, which can be realized using subwavelength periodic structures.

To conclude, we have demonstrated polarization diffraction gratings as polarization-sensitive beam-splitters, as well as optical switches. We have demonstrated that the application of subwavelength quasi-periodic structures, for this purpose, is not limited to optical switches based on linear polarization diffraction gratings, and that more complex designs are possible. The introduction of space-varying geometrical phases through space-variant polarization manipulations, enables new approaches for beam-splitting and the fabrication of novel polarization-sensitive optical elements.

3. Formation of Helical Beams Using Pancharatnam-Berry Phase Optics Elements:

Spiral phase elements with different topological charges based on space-variant Pancharatnam-Berry phase optical elements are presented. Such elements can be realized using continuous computer-generated space-variant subwavelength dielectric gratings. We present a theoretical analysis and experimentally demonstrate spiral geometrical phases for infra-red radiation at a wavelength of 10.6 µm.

Recent years have witnessed a growing interest in helical beams that are exploited in a variety of applications. These include trapping of atoms and macroscopic particles, transferring of orbital angular momentum to macroscopic objects, rotational frequency shifting, the study of optical vortices, and specialized alignment schemes. Beams with helical (or spiral) wavefronts are described by complex amplitudes u(r, ω, )∝exp(−ilω), where r, ω, are the cylindrical coordinates, the radial coordinate and azimuthal angle respectively, and l is the topological charge of the beams. At the center, the phase has a screw dislocation, also called a phase singularity, or optical vortex. Typically, helical beams are formed by manipulating the light after it emerges from a laser by superposition of two orthogonal (non-helical) beams, or by transforming Gaussian beams into helical beams by means of computer-generated holograms, cylindrical lenses and spiral phase elements (SPEs).

Alternatively, a helical beam can be generated inside a laser cavity by inserting SPEs into the laser cavity. The common approaches of forming SPE are as refractive or diffractive optical elements using a milling tool, single-stage etching process with a gray-scale mask, or with multistage etching process. Such helical beam formations are generally either cumbersome or suffer from complicated realization, high aberrations, low efficiency, or large and unstable setup.

In the present invention novel spiral phase elements (SPEs) are disclosed based on the space-domain Pancharatnam-Berry phase. Unlike diffractive and refractive elements, the phase is not introduced through optical path differences, but results from the geometrical phase that accompanies space-variant polarization manipulation. We show that such elements can be realized using continuous computer-generated space-variant subwavelength dielectric gratings. Moreover, we experimentally demonstrate SPEs with different topological charges based on a Pancharatnam-Berry phase manipulation, with an axial symmetric local subwavelength groove orientation, for $CO_2$ laser radiation at a wavelength of 10.6 µm.

The formation of PBOE with spiral geometrical phase, indicates an ability to form complex continuous PBOEs.

The PBOEs are considered as waveplates with constant retardation and continuously space varying fast axes, the orientation of which is denoted by θ(r, ω). It is convenient to describe PBOEs using Jones calculus. The space-dependent transmission matrix for the PBOE is given by applying the optical rotator matrix on the Jones matrix of the subwavelength dielectric grating to yield in helical basis, $$T(r, \omega) = \frac{1}{2}(t_x + t_y e^{i\phi})\begin{pmatrix} 1 & 0 \\ 0 & 1 \end{pmatrix} + \frac{1}{2}(t_x - t_y e^{i\phi})\begin{pmatrix} 0 & \exp[i2\theta(r,\omega)] \\ \exp[-i2\theta(r,\omega)] & 0 \end{pmatrix},$$ (1)

where $t_x$, $t_y$ are the real amplitude transmission coefficients for light polarized perpendicular and parallel to the optical axes, and φ is the retardation of the grating. Thus for an incident plane-wave with arbitrary polarization $|E_{in}\rangle$ we find that the resulting field is, $$|E_{out}\rangle = \sqrt{\eta_E}\,|E_{in}\rangle + \sqrt{\eta_R}\,e^{i2\theta(r,\omega)}|R\rangle + \sqrt{\eta_L}\,e^{i2\theta(r,\omega)}|L\rangle,$$ (2)

where $\eta_E = \left|\frac{1}{2}(t_x + t_y e^{i\phi})\right|^2$, $\eta_R = \left|\frac{1}{2}(t_x + t_y e^{i\phi})\langle E_{in}|L\rangle\right|^2$, $\eta_L = \left|\frac{1}{2}(t_x + t_y e^{i\phi})\langle E_{in}|L\rangle\right|^2$ are the polarization order coupling efficiencies, ⟨α|β⟩ denotes inner product, and $|R\rangle = (1\ 0)^T$ and $|L\rangle = (0\ 1)^T$ represent the right-hand and left-hand circular polarization components respectively. From Eq. (2) one can see that the emerging beam from a PBOE comprises three polarization orders. The first maintains the original polarization state and phase of the incident beam, the second is right-hand circular polarized and has a phase modification of 2θ(r, ω), and the third is opposite to the second at polarization hand and at phase modification. Note that the polarization efficiencies depend on the groove shape and material as well as on the polarization state of the incident beam. For the substantial case of $t_x = t_y = 1$, and φ=π an incident wave with $|R\rangle$ polarization is subject to entire polarization state conversion and results in emerging field, $$|E_{out}\rangle = e^{-i2\theta(r,\omega)}|L\rangle.$$ (3)

Figure 12:
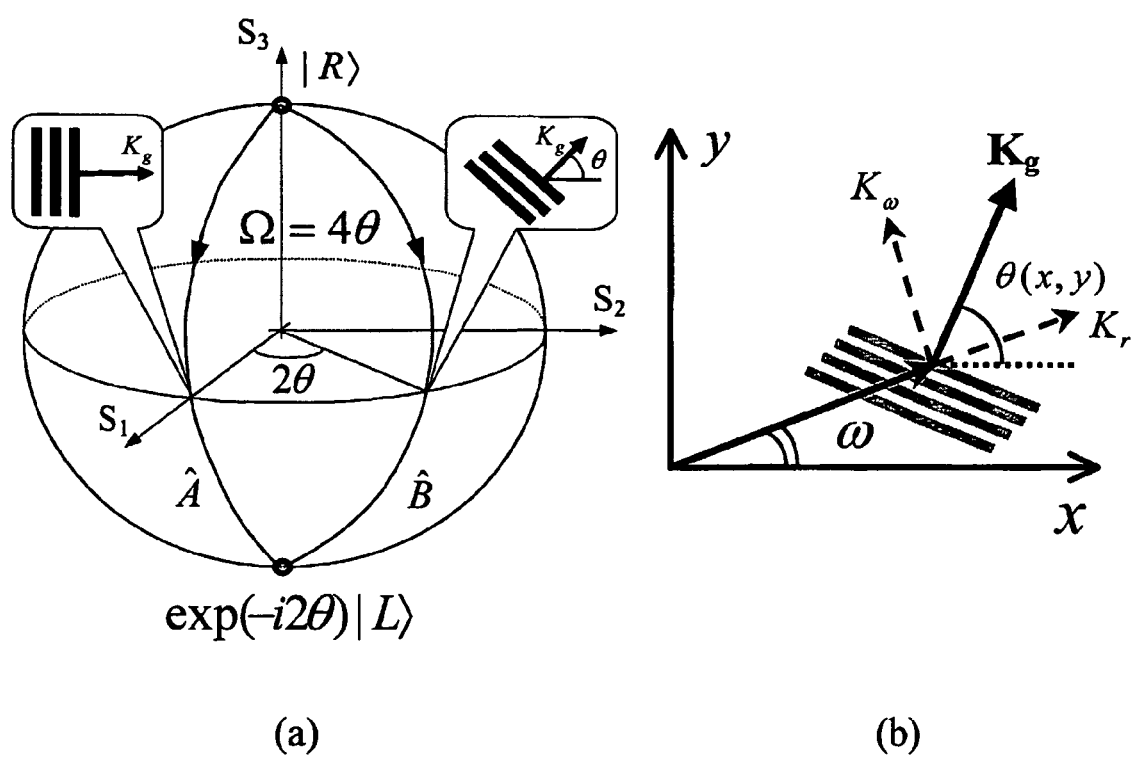
FIG. 12: (a) Illustration of the principle of PBOEs by use of the Poincare sphere; the insets display the different local orientations of subwavelength grooves; (b) illustrates the geometrical definition of the grating vector.

An important feature of Eq. (3) is that the phase factor depends on the local orientation of the subwavelength grating. This dependence is geometrical in nature and originates solely from local changes in the polarization state of the emerging beam. This can be illustrated using the Poincare sphere, representing a polarization state by three Stokes parameters $S_1$, $S_2$ and $S_3$ as depicted in FIG. 12(a). The incident right polarized and the transmitted left polarized waves correspond to the north and the south poles of the sphere, respectively. Since the subwavelength grating is space varying, the beam at different points traverses different paths on the Poincare sphere. For instance, the geodesic lines Ã and B̃ represent different paths for two waves transmitted through element domains of different local orientations θ(r,0) and θ(r,ω). Geometrical calculations show that the phase difference $\phi_p = -2\theta(r,\omega)$ between states corresponding to θ(r, 0) and θ(r,ω) orientations, is equal to half of the area Ω enclosed by the geodesic lines Ã and B̃. This fact is in compliance with the well-known rule, proposed by Pancharatnam, for comparing the phase of two light beams with different polarization, and can be considered as an extension of the mentioned rule into the space-domain.

In order to design a continuous subwavelength structure with the desired phase modification, we define a space-variant subwavelength grating vector $K_g(r,\omega)$, oriented perpendicular to the desired subwavelength grooves. FIG. 12(b)

illustrates this geometrical definition of the grating vector. To design a PBOE with spiral geometrical phase, we need to ensure that the direction of the grating grooves is given by $\theta(r,\omega)=l\omega/2$, where l is the topological charge. Therefore, using FIG. 12(b), the grating vector is given by, $$K_g(r,\omega)=K_0(r,\omega)\{\cos[(l/2-1)\omega]\hat{r}+\sin[(l/2-1)\omega]\hat{\omega}\}, \text{ where}$$

$K_0=2\pi/\Lambda(r,\omega)$ is the local spatial frequency of grating with local period of $\Lambda(r,\omega)$. To ensure the continuity of the subwavelength grooves, we require that $\nabla\times K_g=0$, resulting in a differential equation that can be solved to yield the local grating period. The solution to this problem yields $K_0(r)=(2\pi/\Lambda_0)(r_0/r)^{1/2}$, where $\Lambda_0$ is the local subwavelength period at $r=r_0$. Consequently, the grating function $\phi_g$ (defined so that $K_g=\nabla\phi_g$) is then found by integrating $K_g(r,\omega)$ over an arbitrary path to yield, $$\phi_g(r,\omega)=(2\pi r_0/\Lambda_0)(r_0/r)^{l/2-1}\cos[(l/2-1)\omega]/[l/2-1] \text{ for } l\neq 2,$$
and $\phi_g(r,\omega)=(2\pi r_0/\Lambda_0)\ln(r/r_0)$ for l=2. We then realized a Lee-type binary grating describing the grating function, $\phi_g$, for l=1,2, 3,4. The grating was fabricated for $CO_2$ laser radiation with a wavelength of 10.6 μm, with $\Lambda_0$=2 μm, $r_0$=4.7 mm, and a maximum radius of 6 mm resulting in 2 μm$\leq\Lambda(r)\leq$3.2 μm. We formed the grating with a maximum local period of 3.2 μm in order not to exceed the Wood anomaly of GaAs. The magnified geometry of the gratings for different topological charges are presented in FIG. 2. The elements were fabricated on 500 μm thick GaAs wafers using contact photolithography and electron-cyclotron resonance etching with $BCl_3$ to nominal depth of 2.5 μm, resulting in measured values of retardation $\phi=\pi/2$, and $t_x=t_y=0.9$. These values are close to the theoretical predictions achieved using rigorous coupled wave analysis. The inset in FIG. 2 shows a scanning electron microscope image of one of the dielectric structures.

Figure 13:
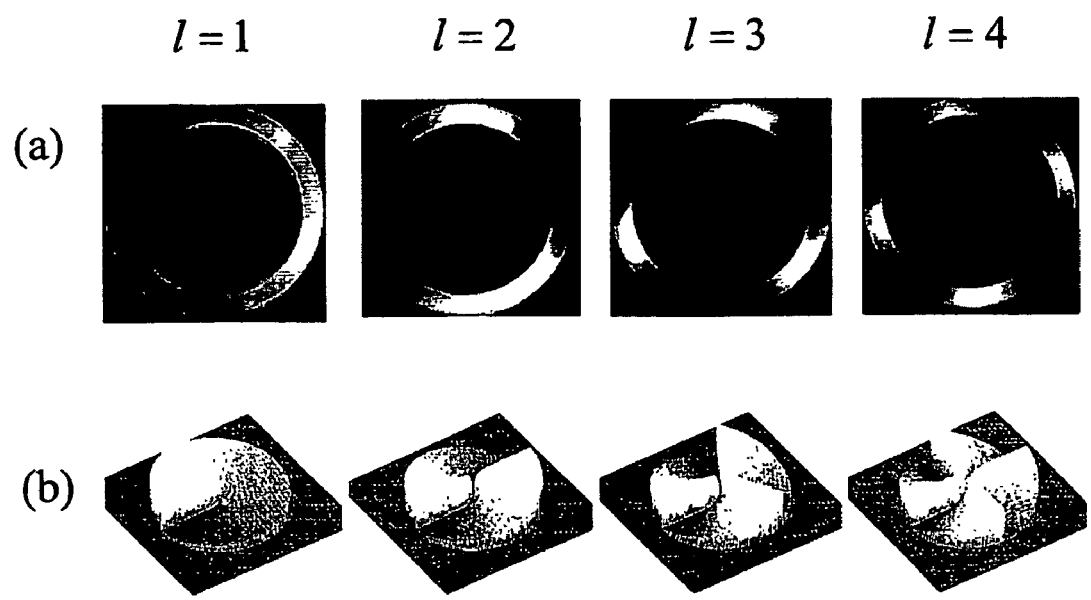
FIG. 13: The geometry of the subwavelength gratings for different topological charges, as well as an image of typical grating profile taken with a scanning-electron microscope.
Figure 14:
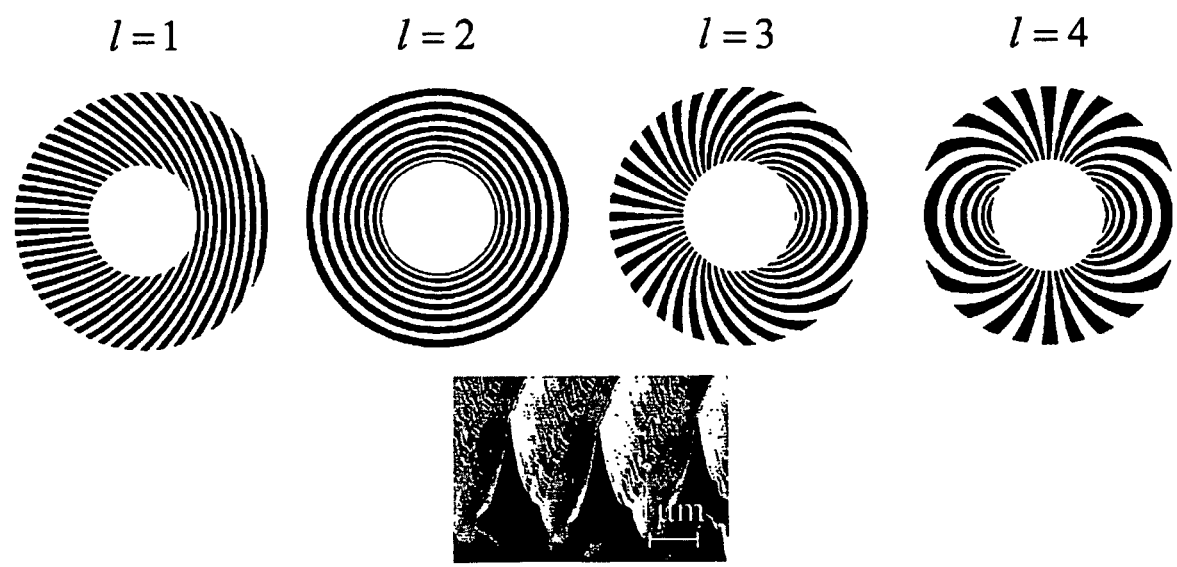
FIG. 14: (a) The interferogram measurements of the spiral PBOEs; (b) the corresponding spiral phases for different topological charges.

Following the fabrication, the spiral PBOEs were illuminated with a right hand circularly polarized beam, |R⟩, at 10.6 μm wavelength. In order to provide experimental evidence of the resulting spiral phase modification of our PBOEs, we used "self-interferogram" measurement using PBOEs with retardation $\phi=\pi/2$. For such elements the transmitted beam comprises two different polarization orders; |R⟩ poloarization state, and |L⟩ with phase modification of $-il\omega$, according to Eq. (2). The near-field intensity distributions of the transmitted beams followed by linear polarizer were then measured. FIG. 13(a) shows the interferogram patterns for various spiral PBOEs. The intensity dependence on the azimuthal angle is of the form $I\propto 1+\cos(l\omega)$, whereas the number of the fringes is equal to l, the topological charge of the beam. FIG. 13(b) illustrates the phase fronts resulting from the interferometer analysis, indicating spiral phases with different topological charges.

Figure 15:
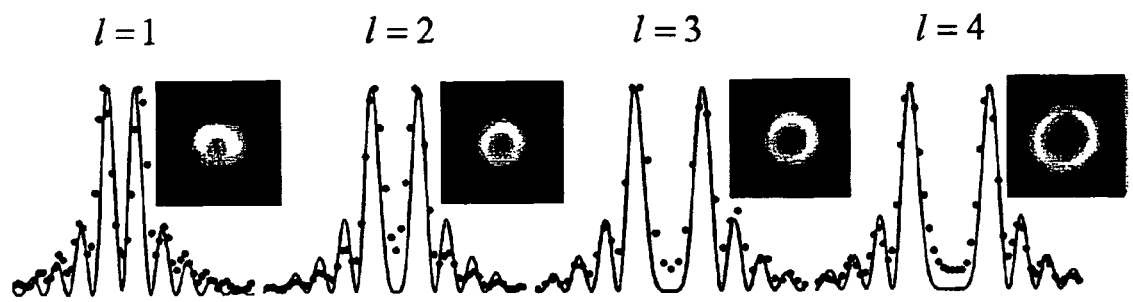
FIG. 15: Experimental far-field images as well as their calculated and measured cross sections for the helical beams with l=1-4

FIG. 15 shows the far-field images of the transmitted beams having various topological charges, as well as the measured and theoretically calculated cross sections. We achieved the experimental result by focusing the beam through a lens with a 500-mm focal length followed by a circular polarizer. We used the circular polarizer in order to transmit only the desired |L⟩ state, and to eliminate the |R⟩ polarization order that appeared because of the error in the etched depth of the grating to achieve the desired retardation of $\phi=\pi$. Dark spots can be observed at the center of the far-field images, providing evidence the phase singularity in the center of the helical beams. We found an excellent agreement between theory and experiment, clearly indicating the spiral phases of the beams with different topological charges.

To conclude, we have demonstrated the formation of helical beams using space-variant Pancharatnam-Berry phase optical elements based on computer generated subwavelength dielectric grating. The formation of the spiral phase by PBOE is subject to the control of the local orientation of the grating. This can be performed with a high level of accuracy using an advanced photolithographic process. In contrast, the formation of SPE based on refractive optics, where the phase is influenced by fabrication errors due to inaccuracy of the etched three-dimensional profile. We are currently investigating a photolithographic process to achieve accurate control of the retardation phase to yield only the desired polarization order.

4. Formation of Multilevel Pancharatnam-Berry Phase Diffractive Optics Using Space-variant Subwavelength Gratings:

Multilevel discrete Pancharatnam-Berry phase diffractive optics using computer-generated space-variant subwavelength dielectric grating is presented. The formation of a multilevel geometrical phase is done by discrete orientation of the local subwavelength grating. We discuss a theoretical analysis and experimentally demonstrate a quantized geometrical blazed phase of polarization diffraction grating, as well as polarization dependent focusing lens for infra-red radiation at wavelength 10.6 μm.

One of the most successful and viable outgrowths of holography involves diffractive optical elements (DOE). DOEs diffract light from a generalized grating structure having non-uniform groove spacing. They can be formed as a thin optical element that provides unique functions and configurations. High diffraction efficiencies for DOEs can be obtained with kinoforms that are constructed as surface relief gratings on some substrate. However, in order to reach a high efficiency, it is necessary to resort to complex fabrication processes that can provide the required accuracies for controlling the graded shape and depth of the surface grooves. Specifically, in one process a single photomask with variable optical density is exploited for controlling the etching rate of the substrate to form the desired graded relief gratings, or using multiple binary photomasks so the graded shape is approximated by multilevel binary steps. Both fabrication processes rely mainly on etching techniques that are difficult to accurately control. As a result, the shape and depth of the grooves can differ from those desired, which leads to reduction of diffraction efficiency and poor repeatability of performance.

In the present invention we consider DOEs based on the space-domain Pancharatnam-Berry phase. Unlike diffractive and refractive elements, the phase is not introduced through optical path differences, but results from the geometric phase that accompanies space-variant polarization manipulation. The elements are polarization dependent, thereby, enabling multipurpose optical elements that are suitable for applications such as optical interconnects, beam splitting, and optical switching. Recently, we have demonstrated continuous Pancharatnam-berry phase optical elements (PBOEs) based on subwavelength grating. However, applying the constraint on the continuity of the grating leads to space varying of the local periodicity. Therefore, in order not to exceed the Wood anomaly, the elements are limited in their dimensions as well as optical parameters. Moreover, the results of space varying periodicity complicates the optimization of the photolithographic process. In order to overcome these limitations, we show that such elements can be realized with a multilevel discrete binary geometrical phase, using a computer-generated space-variant subwavelength dielectric grating. By multilevel discrete controlling of the local orientation of the grating, having uniform periodicity, we can achieve any desired phase element. We experimentally demonstrate Multilevel Pancharatnam-Berry phase Optical Elements (Multilevel-PBOE) as blazed diffraction grating and diffractive focusing lens, for the 10.6-μm wavelength from a $CO_2$ laser, and show that high diffraction efficiencies can be attained utilizing single binary computer-generated mask, as well as forming multipurpose polarization dependent optical elements.

The PBOEs are considered as waveplates with constant retardation and space varying fast axes, the orientation of which is denoted by $\theta(x,y)$. It is convenient to form such space varying waveplate using subwavelength grating. When the period of a subwavelength periodic structure is smaller than the incident wavelength, only zero order is a propagating order, and all other orders are evanescent. The subwavelength periodic structure behaves as a uniaxial crystal with the optical axes parallel and perpedicular to the subwavelength grooves. Therefore, by fabricating quasi-periodic subwavelength structures, for which the period and orientation of the subwavelength grooves was space varying, we realized rotating waveplates. Furthermore, we showed that such polarization manipulation inevitably led to phase modification of geometrical origin results from local polarization manipulation and was in-fact a manifestation of the geometrical Pancharatnam-Berry phase.

It is convenient to describe PBOEs using Jones calculus. The space-dependent transmission matrix for PBOE is given by applying the optical rotator matrix on the Jones matrix of the subwavelength dielectric grating to yield in helical basis, $$T(r,\omega) = \frac{1}{2}(t_x + t_y e^{i\phi}) \begin{pmatrix} 1 & 0 \\ 0 & 1 \end{pmatrix} + \frac{1}{2}(t_x - t_y e^{i\phi}) \begin{pmatrix} 0 & \exp[i2\theta(x,y)] \\ \exp[-i2\theta(r,\omega)] & 0 \end{pmatrix}, \quad (1)$$

where $t_x$, $t_y$ are the real amplitude transmission coefficients for light polarized perpendicular and parallel to the optical axes, and $\phi$ is the retardation of the grating. Thus for an incident plane-wave with arbitrary polarization $|E_{in}\rangle$, we find that the resulting field is, $$|E_{out}\rangle = \sqrt{\eta_E}|E_{in}\rangle + \sqrt{\eta_R}\,e^{i2\theta(x,y)}|R\rangle + \sqrt{\eta_L}\,e^{i2\theta(x,y)}|L\rangle, \quad (2)$$

$$\text{where } \eta_E = \left|\frac{1}{2}(t_x + t_y e^{i\phi})\right|^2,$$

$$\eta_R = \left|\frac{1}{2}(t_x + t_y e^{i\phi})\langle E_{in}|L\rangle\right|^2, \eta_L = \left|\frac{1}{2}(t_x + t_y e^{i\phi})\langle E_{in}|R\rangle\right|^2,$$

are the polarization order coupling efficiencies, $\langle\alpha|\beta\rangle$ denotes inner product, and $|R\rangle=(1\ 0)^T$ and $|L\rangle=(0\ 1)^T$ represent the right-hand and left-hand circular polarization components, respectively. From Eq. (2) it is evident that the emerging beam from a PBOE comprises three polarization orders. The first maintains the original polarization state and phase of the incident beam, the second is right-hand circular polarized and has a phase modification of $2\theta(x,y)$, and the third is opposite to the second at polarization hand and at phase modification. Note that the polarization order coupling efficiencies depend on the groove shape and material, as well as on the polarization state of the incident beam. For the substantial case of $t_x=t_y=1$, and $\phi=\pi$ an incident wave with $|R\rangle$ polarization is subject to entire polarization state conversion and results in emerging field, $$|E_{out}\rangle = e^{-i2\theta(x,y)}|L\rangle. \quad (3)$$

An important feature of Eq. (3) is the phase factor $\phi_d(x,y)|_{mod\ 2\pi} = -2\theta(x,y)|_{mod\ 2\pi}$ that depends on the local orientation of the subwavelength grating. This dependence is geometrical in nature and originates solely from local changes in the polarization state of the emerging beam.

Figure 16:
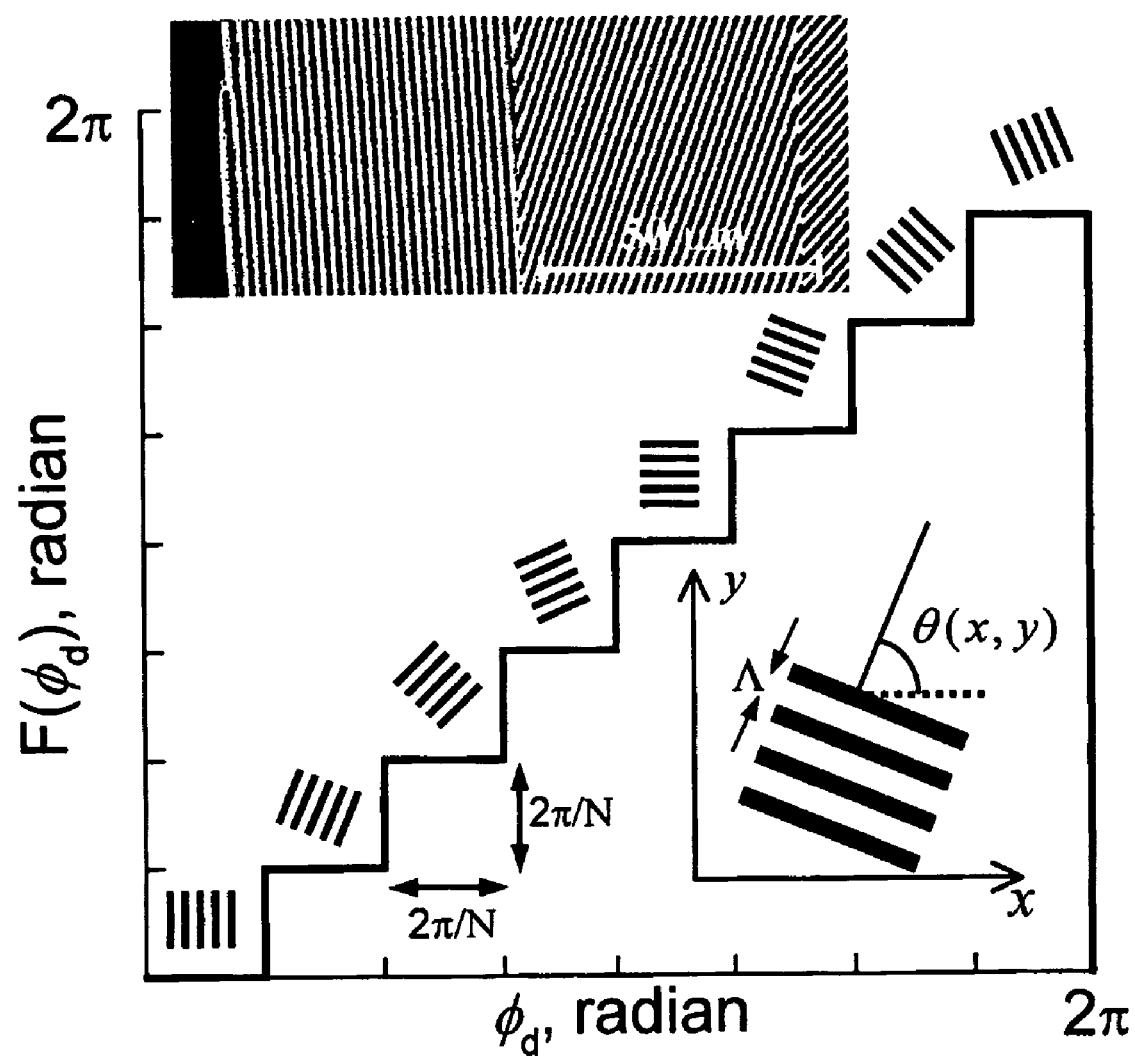
FIG. 16: Actual quantized phase $F(\phi_d)$ as a function of the desired phase $\phi_d$, as well as the multilevel discrete binary local grating orientation. Inset, a scanning electron microscope image of a region on the subwavelength structure.

In our approach, the continuous phase function $\phi_d(x,y)$ is approximated with multilevel discrete binary steps leading to formation of PBOE with multilevel discrete binary local grating orientation. In the scalar approximation, an incident wave front is multiplied by the phase function of the multilevel phase element that is described by, $\exp[iF(\phi_d)]$, where $\phi_d$ is the desired phase and $F(\phi_d)$ is the actual quantized phase. The division of the desired phase $\phi_d$ to N equal steps is shown in FIG. 16, where the actual quantized phase $F(\phi_d)$ is given as a function of the desired phase. The Fourier expansion of the actual phase front is given by $\exp[iF(\phi_d)]=\Sigma_l C_l \exp(il\phi_d)$, where $C_l$ is the lth-order coefficient of the Fourier expansion. The diffraction efficiency, $\eta_l$, of the lth-diffracted order is given by $\eta_l=|C_l|^2$. Consequently, the diffraction efficiency $\eta_l$ for the first diffracted order for such an element is related to the number of discrete levels N by $\eta_l=[(N/\pi)\sin(\pi/N)]^2$. This equation indicates that for 2,4,8, and 16 phase quantization levels, the diffraction efficiency will be 40.5%, 81.1%, 95.0%, and 98.7%, respectively. The creation of a multilevel-PBOE is done by multilevel discrete orientation of the local subwavelength grating as illustrated in FIG. 16.

Supposing we wish to design a blazed polarization diffraction grating, i.e. a grating for which all the diffracted energy is in the 1st order, when the incident beam is $|R\rangle$ polarized. We designed a multilevel-PBOE that acts as a diffraction grating by requiring that $\phi_d=(2\pi/d)x|_{mod\ 2\pi}$, forming the quantized phase function $F(\phi_d)$ depicted in FIG. 16, where d is the period of the diffraction grating. In order to illustrate the effectiveness of our approach, we realized multilevel diffraction gratings with various number of discrete levels, N=2,4,8,16,126. The grating was fabricated for $CO_2$ laser radiation with a wavelength of 10.6 μm, with diffraction grating period d=2 mm and subwavelength grating period Λ=2 μm. The magnified geometry of the gratings for number of discrete levels, N=4, is presented in FIG. 17, as well as their predicted geometrical quantized phase distribution. The elements were fabricated on 500 μm thick GaAs wafers using single binary mask, contact photolithography and electron-cyclotron resonance etching with $BCl_3$ to nominal depth of 2.5 μm, resulting in measured values of retardation $\phi=\pi/2$, and $t_x=t_y=0.9$. By combining two such gratings we obtained a grating with $\phi=\pi$. These values are close to the theoretical predictions achieved using rigorous coupled wave analysis.

Figure 17:
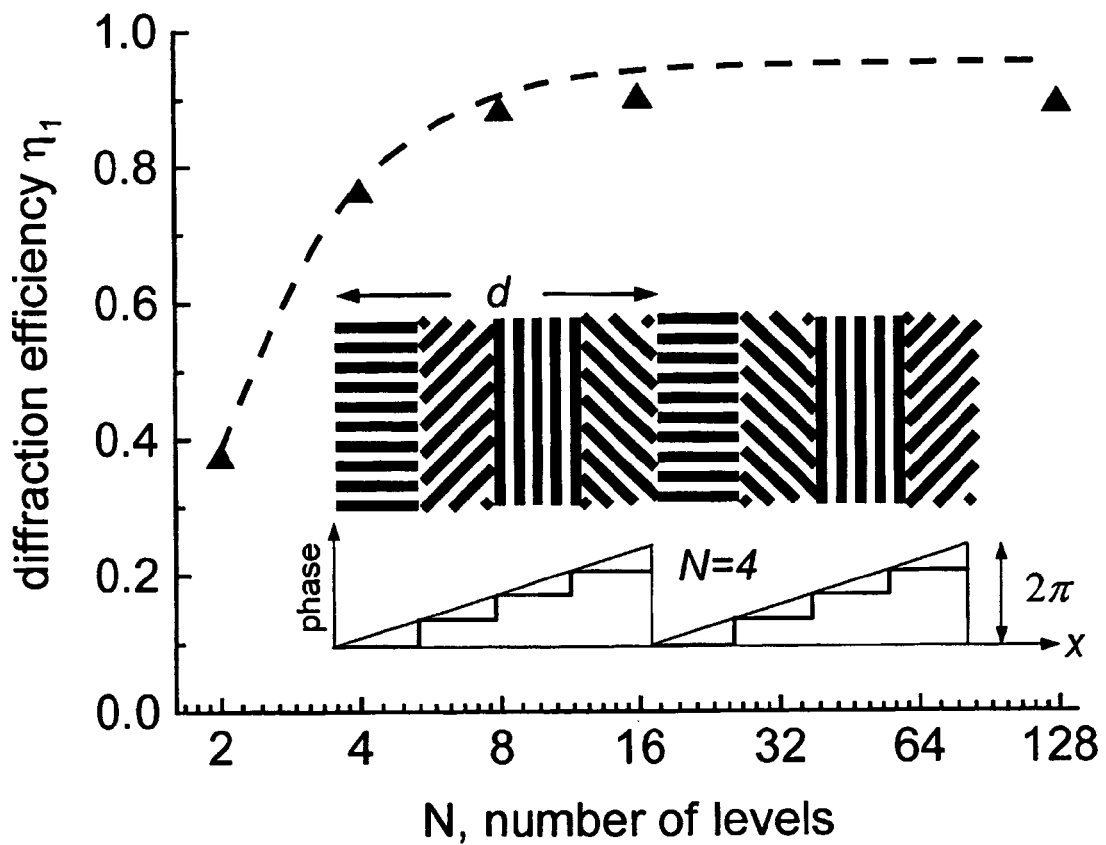
FIG. 17: The magnified geometry of the grating for N=4, as well as the predicted geometrical quantized phase distribution. Also shown, the measured (triangles) and predicted (dashed curve) diffraction efficiency as a function of the number of discrete levels, N.

Following the fabrication, the multilevel-PBOEs were illuminated with a right-hand circularly polarized beam, $|R\rangle$, at 10.6 μm wavelength. We used the circular polarized in order to transmit only the desired $|L\rangle$ state, and to eliminate the $|R\rangle$ polarization order, which appeared because of the error in the etched depth of the grating to achieve the desired retardation of $\phi=\pi$. FIG. 17 shows the measured and predicted diffraction efficiency for first diffracted order for the different multilevel-PBOEs. There is a good agreement between the experimental results and the prediction efficiencies, providing verification of the expected multilevel discrete binary phase.

Figure 18:
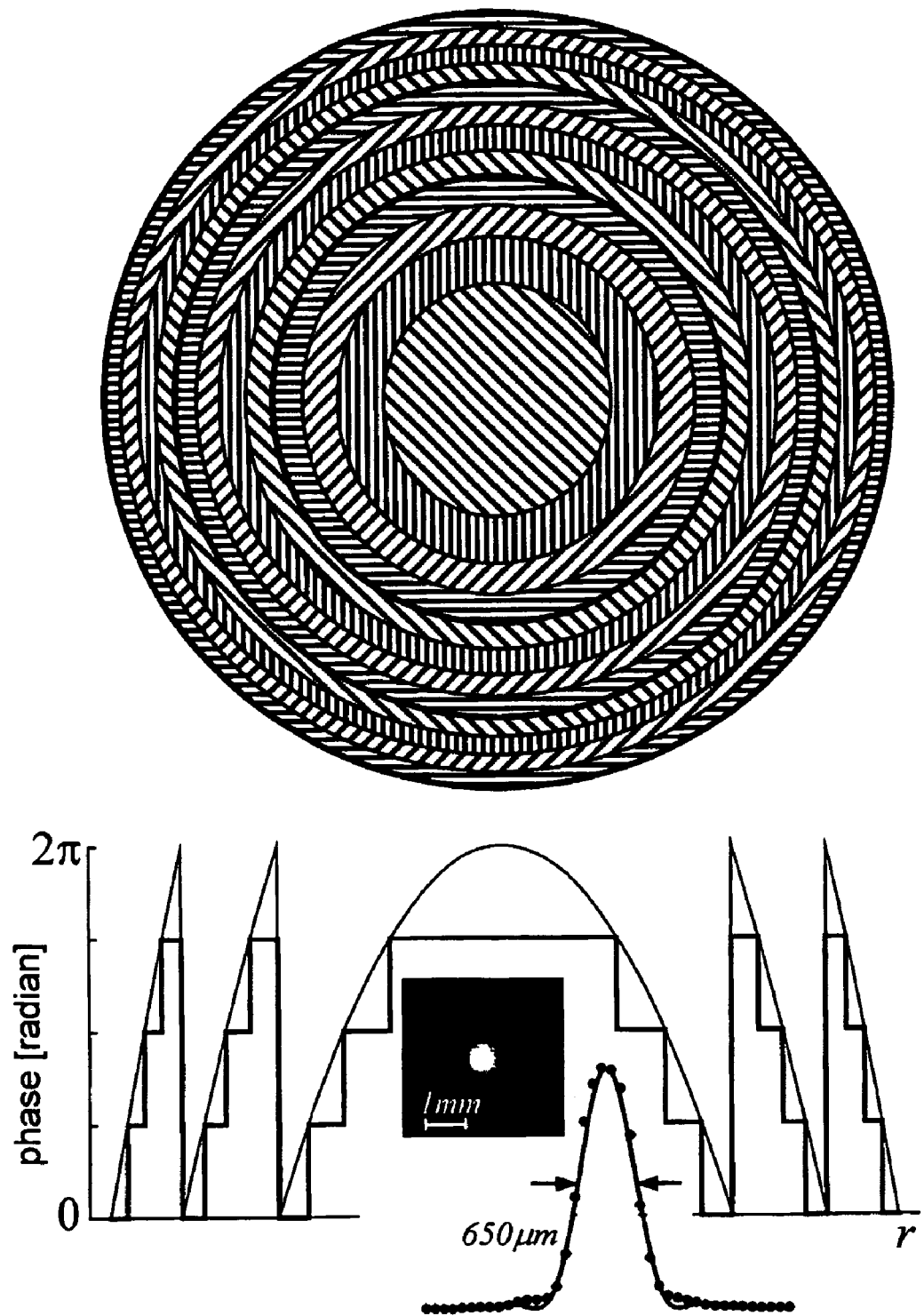
FIG. 18: Illustration of the magnified geometry of a multilevel-PBOE focussing lens with N=4, as well as the predicted multilevel geometrical phase. Inset, the image of the focused spot size as well as the measured (dots), and theoretically calculated (solid curve) cross section.

In addition, we formed a multilevel Pancharatnam-Berry focusing element for a 10.6 µm wavelength, which had a multilevel discrete spherical phase function of $F(\phi_d)=F[(2\pi/\lambda)(x^2+y^2+f^2)^{1/2}]$, with 10 mm diameter, focal length f=200 mm and number of discrete levels N=8. FIG. 18 illustrates the magnified geometry of a focusing lens based on multilevel-PBOE with N=4, as well as the predicted multilevel geometrical phase. A scanning electron microscope image of a region on the subwavelength structure, which we had fabricated, is shown in the inset of FIG. 16. Diffraction limited focused spot size for |L⟩ transmitted beam was measured, while illuminating the element with |R⟩ polarization state, and inserting a circular polarizer. The inset in FIG. 18 shows the image of the focused spot size as well as the measured and theoretically calculated cross section. The measured diffraction efficiency was 95% in agreement with the predicted value. The geometrical phase of the PBOE is polarization dependent, therefore, we experimentally confirmed that our element is a converging lens for incident |R⟩ state, and a diverging lens for incident |L⟩ state, as indicated by Eq. (2). Moreover, it is possible to form bifocal lens for PBOE with a retardation phase of $\phi=\pi$ while illuminating with a linear polarization beam, and inserting refractive lens following the PBOE. Trifocal lens can be created for PBOE with a retardation phase of $\phi=\pi/2$ resulting in distinct three different focuses for |R⟩, linear, and |L⟩ polarization states.

To conclude, We have demonstrated the formation of multilevel discrete Pancharatnam-Berry phase optical elements using computer-generated space-variant subwavelength dielectric grating. We realized blazed diffraction grating, as well as polarization dependent focusing lens. The introduction of space varying geometrical phases through multilevel-PBOEs, enables new approaches for novel polarization-sensitive optical elements. We are currently investigating a photolithographic process with the purpose of achieving accurate control of the retardation phase to yield only the desired polarization order.

5. Near-field Fourier Transform Polarimetry By Use of a Quantized Space-variant Subwavelength Grating Optical polarimetry measurement has been widely used for a large range of applications such as ellipsometry (J. Lee, J. Koh and R. W. Collins, "Multichannel Mueller matrix ellipsometer for real-time spectroscopy of anisotropic surfaces and films", Opt. Lett. 25, 1573-1575 (2000)), bio-imaging (V. Sankaran, M. J. Everett, D. J. Maitland and J. T. Walsh, Jr., "Comparison of polarized light propagation in biological tissue and phantoms", Opt. Lett. 24, 1044-1046 (1999)), imaging polarimetry (G. P. Nordin, J. T. Meier, P. C. Deguzman and M. W. Jones, "Micropolarizer array for infrared imaging polarimetry", J. Opt. Soc. Am. A 16, 1168-1174 (1999)) and optical communications (P. C. Chou, J. M. Fini and H. A. Haus, "Real-time principle state characterization for use in PMD compensators", IEEE Photon. Technol. Lett. 13, 568-570 (2001)). A commonly used method is the measuring of the time-depended signal once the beam is transmitted through a photoelastic modulator (G. E. Jellison, Jr., "Four channel polarimeter for time-resolved ellipsometry", Opt. Lett., 12, 766-768 (1987)) or a rotating quarter wave plate (QWP) followed by an analyzer (E. Collet, Polarized Light (Marcel Dekker, New York, 1993)). The polarization state of the beam can be derived by Fourier analysis of the detected signal. This method, however, requires a sequence of consecutive measurements, thus making it impractical for real-time polarization measurement in an application such as adaptive polarization-mode dispersion compensation in optical communication. Moreover, it involves either mechanically or electronically active elements resulting in a complicated and cumbersome device.

An increasing demand for faster and simpler methods has led to the development of the simultaneously four-channel ellipsometer (R. M. A. Azzam, "Integrated polarimeters based on anisotropic photodetectors", Opt. Lett. 12, 555-557 (1987)). Using this method, the beam is split into four channels; each is analyzed using different polarization optics while the real-time polarization state is calculated from the measured intensities. The main drawback of this method is its high sensitivity to statistical errors due to the low number of measurements. Recently, Gori (F. Gori, "Measuring Stokes parameters by means of a polarization grating", Opt. Lett. 24, 584-586 (1999)) proposed real-time polarimetry by use of a space-variant polarizer, in what is basically a manifestation of the four-channel technique. This method relies on measuring the far-field intensity and therefore is not suitable for on-chip integrated applications.

In a recent paper (Z. Bomzon, G. Biener, V. Keiner and E. Hasman, "Real-time analysis of partially polarized light with a space-variant subwavelength dielectric grating", Opt. Lett., 27, 188-190 (2002)) we presented a space domain analogy to the rotating QWP method. Using this method, spatial intensity distribution analysis is applied for real-time, near-field polarimetry. The intensity modulation is achieved by a space varying wave plate, realized as a computer-generated, space-variant, continuous subwavelength grating, followed by an analyzer. However, continuity of the subwavelength grating had led to a space dependent local period. Therefore, in order for the period not to exceed the Wood anomaly, the elements were restricted in their physical dimensions. Moreover, the varying periodicity had complicated the optimization of the photolithographic process and had led to spatial variations in the retardation of the element.

In this paper we propose real-time near-field polarimetry by spatial discrete rotating of the groove orientation of a subwavelength dielectric grating. The grating of this type of element is divided into equal sized zones. The subwavelength grooves are of uniform orientation and period at each zone and are rotated at quantized angles, respective to each zone. The resulting elements are unlimitted in their dimensions and have uniform optical parameters. We named such elements quantized space-variant subwavelength dielectric gratings (QSGs). Our method is less sensitive to statistical errors due to the increased number of measurements, and is suitable for real-time applications and can be used in compact configurations.

Figure 19:
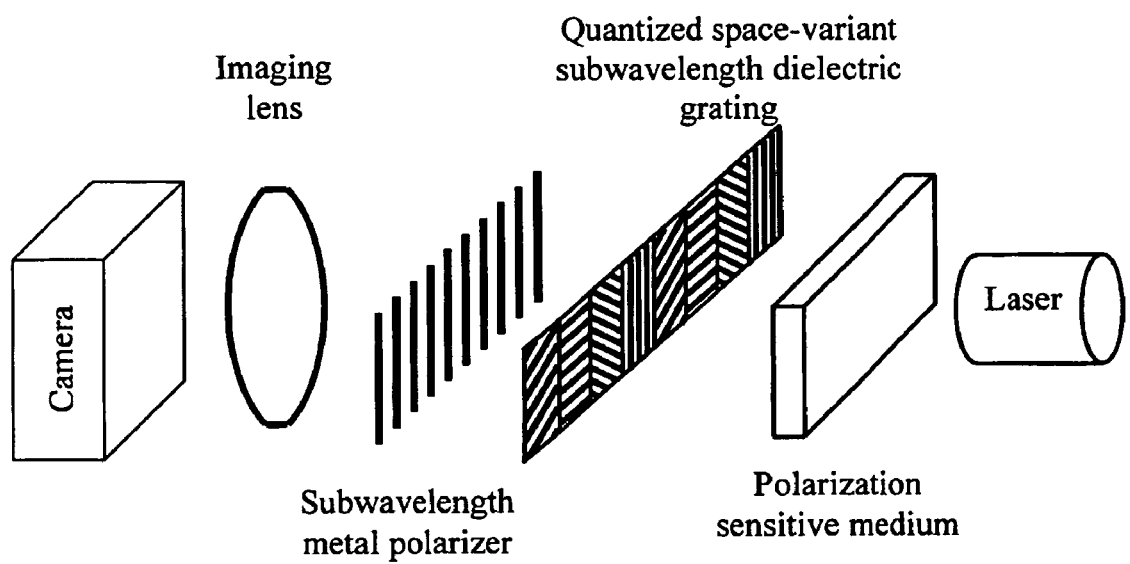
FIG. 19: Schematic presentation of the near-field Fourier transform polarimetry based on a quantized space-variant subwavelength dielectric grating followed by a subwavelength metal stripes polarizer.

The concept of the near-field polarimetry based on subwavelength gratings is presented in FIG. 19. A uniformly polarized light is incident upon a polarization sensitive medium (e.g. biological tissue, optical fiber, wave plate etc.) and then transmitted through a QSG, which acts as a space-variant wave plate, followed by a polarizer. The resulting intensity distribution is imaged onto a camera and captured for further analysis. It is shown hereinafter that the emerging intensity distribution is uniquely related to the polarization state of the incoming beam. This dependence is given by a spatial Fourier series analysis, whereby the resulting Fourier coefficients completely determine the polarization state of the incoming beam.

The QSGs are considered as wave plates with constant retardation and space varying fast axes, the orientation of which is denoted by $\theta(x,y)$. It is convenient to form such space varying wave plates by use of a subwavelength grating. When the period of a subwavelength periodic structure is smaller than the incident wavelength, only the zero order is a propagating order, and all other orders are evanescent. The subwavelength periodic structure behaves as a uniaxial crystal with the optical axes parallel and perpendicular to the subwavelength grooves. Therefore, by fabricating quasi-periodic subwavelength structures, for which the orientation of the subwavelength grooves is changed along the length of the element, space-variant wave plates can be formed.

Figure 20:
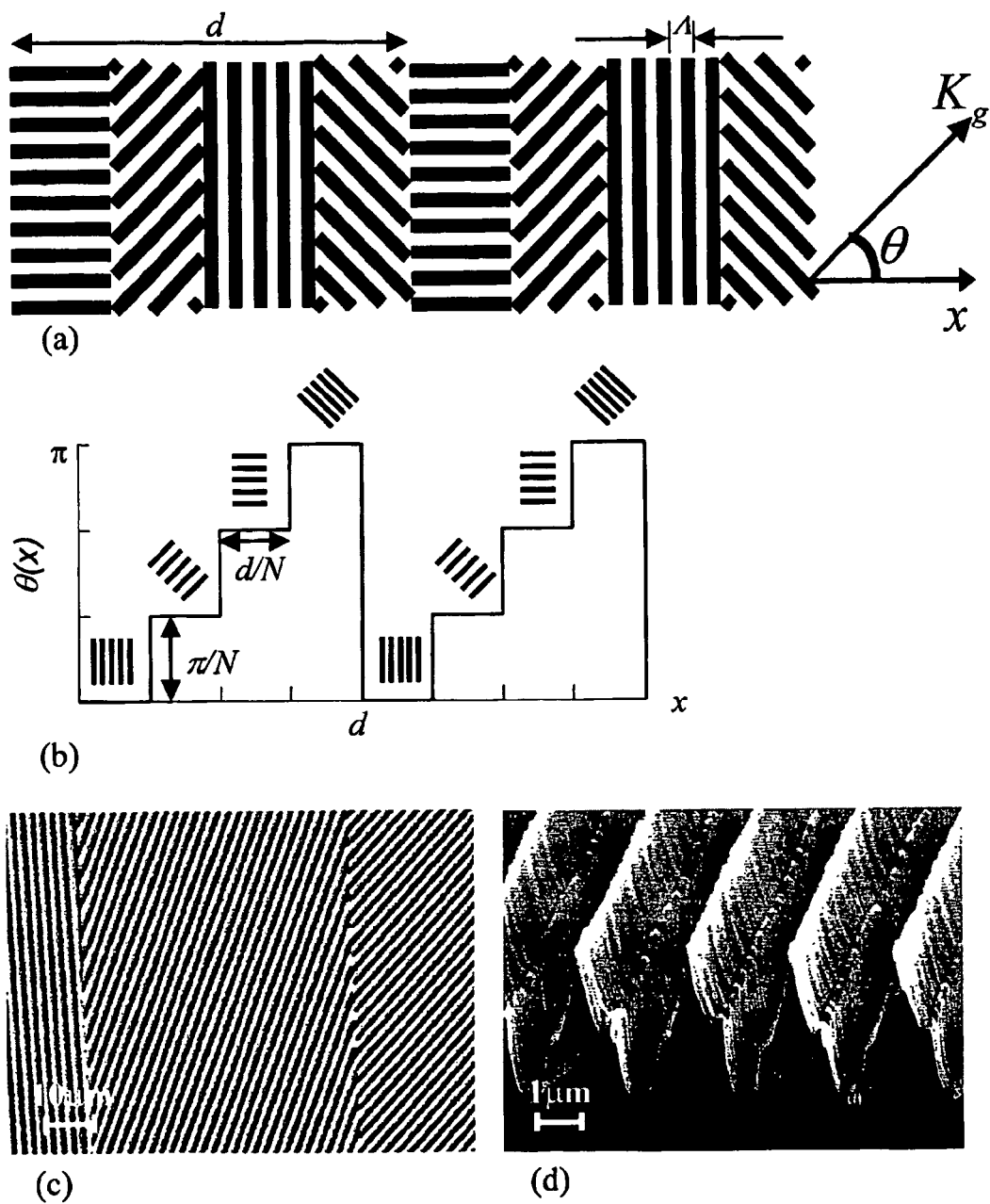
FIG. 20: (a) The magnified geometry of the quantized space-variant dielectric grating with a number of quantized levels N=4. (b) The quantized rotation angle of the subwavelength grating as a function of the x coordinate; the inset illustrates the local groove orientation. (c) Scanning electron microscopy image of a region on the subwavelength structure (d) Scanning electron microscopy image of a cross section of the subwavelength grooves.
Figure 21:
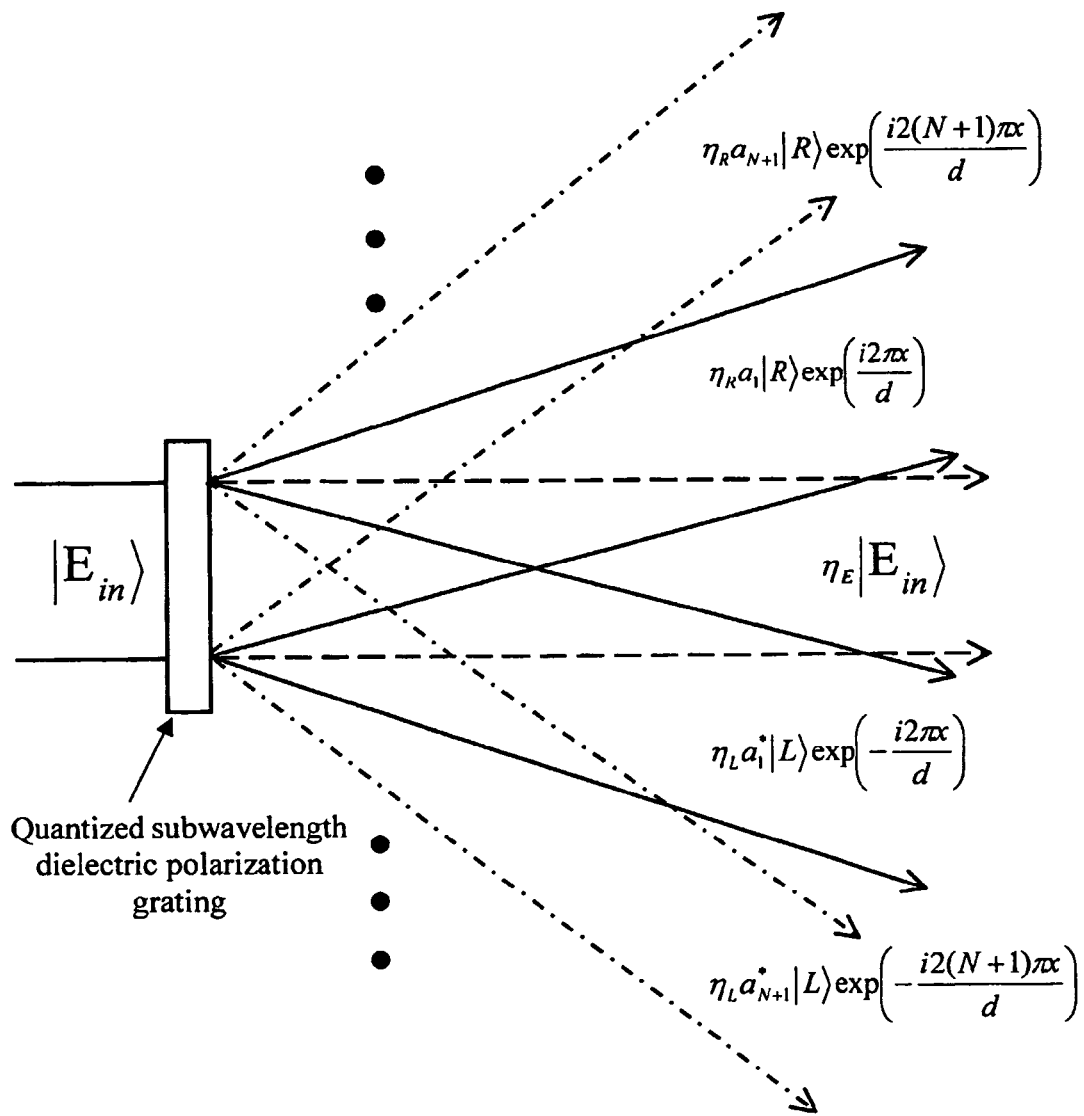
FIG. 21: The diffraction orders emerging from the QSG; zero order (dashed), first order for |R⟩ and |L⟩ polarized beams (solid), and higher order for |R⟩ and |L⟩ polarized beams (dash-dot).

The creation of a QSG is done by discrete orientation of the local subwavelength grating as illustrated in FIG. 20(*a*). The QSG is obtained by dividing the element into N equal sized zones, along the x-axis, where each zone consists of a uniform orientation as well as a uniform subwavelength grating period. The orientation of the grooves is defined by the angle, $\theta$, between the grating vector $K_g$ of the subwavelength grating (perpendicular to the grooves) and the x-axis, therefore $\theta$ is a function of the x coordinate [$\theta(x)$]. The grating period, d, is defined as the distance between the nearest zones having identical orientations. We consider the period of grating d as larger than the incident wavelength $\lambda$, whereby the local subwavelength period of the grooves $\Lambda$, is smaller than the incident wavelength. FIG. 20(*a*) presents a QSG with a period that consists of N=4 zones of uniform orientation of the subwavelength grating. We named N as the number of quantized levels.

The polarization state within Stokes representation is described by a Stokes vector $S=(S_0, S_1, S_2, S_3)^T$, where $S_0$ is the intensity of the beam, whereas $S_1$, $S_2$, $S_3$ represent the polarization state. In general, $S_0^2 \geq S_1^2 + S_2^2 + S_3^2$, where the equality holds for fully polarized beams. The polarization state emerging from an optical system (i.e. wave plates, polarizers etc.) is linearly related to the incoming polarization state through, S'=MS, where M is a 4-by-4 real Mueller matrix of the system and S, S' are the Stokes vectors of the incoming and outgoing polarization states respectively.

The optical system under consideration consists of a QSG followed by a polarizer. This composite element can be described, in Cartesian coordinates, by Mueller matrix $$M = PR(-\theta)WR(\theta), \quad (1)$$

where $$R(\theta) = \begin{pmatrix} 1 & 0 & 0 & 0 \\ 0 & \cos 2\theta & \sin 2\theta & 0 \\ 0 & -\sin 2\theta & \cos 2\theta & 0 \\ 0 & 0 & 0 & 1 \end{pmatrix}$$

is the Mueller matrix that represents rotation of the axis frame by angle $\theta$, $$W = \frac{1}{2}\begin{pmatrix} t_x^2 + t_y^2 & t_x^2 - t_y^2 & 0 & 0 \\ t_x^2 - t_y^2 & t_x^2 + t_y^2 & 0 & 0 \\ 0 & 0 & 2t_x t_y \cos\phi & -2t_x t_y \sin\phi \\ 0 & 0 & 2t_x t_y \sin\phi & 2t_x t_y \cos\phi \end{pmatrix}$$

is the Mueller matrix of a transversally uniform retarder, with retardation $\phi$ and real transmission coefficients for two eigenpolarizations $t_x$, $t_y$. Finally, $$P = \frac{1}{2}\begin{pmatrix} 1 & 1 & 0 & 0 \\ 1 & 1 & 0 & 0 \\ 0 & 0 & 0 & 0 \\ 0 & 0 & 0 & 0 \end{pmatrix}$$

is the Mueller matrix of an ideal horizontal polarizer.

The outgoing intensity can be related to the incoming polarization state of the beam by calculating the Mueller matrix given by Eq. (1) and using the linear relation between the incoming and the outgoing stokes vectors, yielding, $$S_0'(x) = \tfrac{1}{4}\{AS_0 + \tfrac{1}{2}(A+C)S_1 + B(S_1+S_0)\cos 2\theta(x) + (BS_2 - DS_3)\sin 2\theta(x) + \tfrac{1}{2}(A-C)(S_1\cos 4\theta(x) + S_2\sin 4\theta(x))\}, \quad (2)$$

where $A = t_x^2 + t_y^2$, $B = t_x^2 - t_y^2$, $C = 2t_x t_y \cos\phi$, $D = 2t_x t_y \sin\phi$.

Equation (2) describes the intensity of the outgoing beam as a truncated Fourier series with coefficients that depend on the Stokes parameters of the incident beam. In our case $\theta$ represents the quantized rotation angle of the retarder, (subwavelength grating), as a function of the location along the x-axis. A single period of $\theta$ can be written explicitly as, $$\theta(x) = \begin{cases} 0 & 0 < x < \dfrac{d}{N} \\ \dfrac{\pi}{N} & \dfrac{d}{N} < x < \dfrac{2d}{N} \\ \vdots & \vdots \\ \dfrac{\pi(m-1)}{N} & \dfrac{d(m-1)}{N} < x < \dfrac{dm}{N} \\ \vdots & \vdots \\ \dfrac{\pi(N-1)}{N} & \dfrac{d(N-1)}{N} < x < d \end{cases}, \quad (3)$$

where m is an integer number, $N \geq m \geq 0$. FIG. 2(*b*) illustrates $\theta(x)$ for a number of quantized levels N=4. Note that $\theta(x)$ is periodic in $\pi$.

Inserting the quantized angle described by Eq. (3), into Eq. (2) and then expanding the trigonometric expressions into a Fourier series yields the resulting intensity distribution, $$S_0'(x) = \frac{1}{4}\left\{\begin{array}{l} AS_0 + \dfrac{1}{2}(A+C)S_1 + \\[4pt] B(S_1+S_0)\sum_{n=1}^{\infty}\left[a_n\cos\dfrac{2\pi n x}{d} + b_n\sin\dfrac{2\pi n x}{d}\right] + \\[4pt] (BS_2 - DS_3)\sum_{n=1}^{\infty}\left[c_n\sin\dfrac{2\pi n x}{d} + d_n\cos\dfrac{2\pi n x}{d}\right] + \\[4pt] \dfrac{1}{2}(A-C)\left(\begin{array}{l} S_1\sum_{n=1}^{\infty}\left[e_n\cos\dfrac{4\pi n x}{d} + f_n\sin\dfrac{4\pi n x}{d}\right] + \\ S_2\sum_{n=1}^{\infty}\left[g_n\sin\dfrac{4\pi n x}{d} + h_n\cos\dfrac{4\pi n x}{d}\right] \end{array}\right) \end{array}\right\}. \quad (4)$$

The corresponding Fourier coefficients in Eq. (4) are given by, $$a_n = c_n = \frac{N}{2\pi n}\sin\left(\frac{2\pi}{N}\right) \quad (5)$$

$$b_n = d_n = \frac{N}{\pi n}\sin^2\left(\frac{\pi}{N}\right)$$

$$e_n = g_n = \frac{N}{4\pi n}\sin\left(\frac{4\pi}{N}\right)$$

$$f_n = h_n = \frac{N}{2\pi n}\sin^2\left(\frac{2\pi}{N}\right),$$

for n=kN±1 (k=0,1,2,3, ...), and zero otherwise. One can see, from Eq. (5), that increasing the number of quantized levels, N, increases $a_l$, $c_l$, $e_l$, $g_l$ towards unity and decreases $b_l$, $d_l$, $f_l$, $h_l$ towards zero. Moreover, as the number of quantized levels increases, the higher order terms tend to reach zero as well, thus at the limit of an infinite number of quantized levels, Eq. (4) is degenerated to the case of continuous space-variant subwavelength grating.

Using the Fourier analysis, the first coefficients of Eq. (4) yields, $$AS_0 + \frac{1}{2}(A+C)S_1 = \frac{2}{\pi}\int_0^{2\pi} S'_0(x)dx, \quad (6a)$$

$$B(S_1+S_0)a_1 + (BS_2-DS_3)d_1 = \frac{4}{\pi}\int_0^{2\pi} S'_0(x)\cos\left(\frac{2\pi x}{d}\right)dx, \quad (6b)$$

$$(BS_2-DS_3)c_1 + B(S_1+S_0)b_1 = \frac{4}{\pi}\int_0^{2\pi} S'_0(x)\sin\left(\frac{2\pi x}{d}\right)dx, \quad (6c)$$

$$\frac{1}{2}(A-C)(S_1e_1+S_2h_1) = \frac{4}{\pi}\int_0^{2\pi} S'_0(x)\cos\left(\frac{4\pi x}{d}\right)dx, \quad (6d)$$

$$\frac{1}{2}(A-C)(S_2g_1+S_1f_1) = \frac{4}{\pi}\int_0^{2\pi} S'_0(x)\sin\left(\frac{4\pi x}{d}\right)dx. \quad (6e)$$

These equations are a linear combination of the Stokes parameters of the incident beam. In order to extract $S_0$-$S_3$, Eqs. (6a)-(6e) should represent 4 independent equations, which are obtained for N≧5. However, a larger number of quantized levels, N, is desirable, in which case a larger portion of the intensity is represented by the first harmonics of every series of Eq. (4) and, therefore, a larger signal to noise ratio can be obtained.

Subwavelength quasi-periodic structures are conveniently described as depicted in FIG. 20 using Jones calculus. The QSG, which is a birefringent element with optical axes, (parallel and perpendicular to the grating grooves) that rotate periodically in the x-direction, can be represented as a polarization diffraction grating. When a plane wave with a uniform polarization is incident on such a periodic subwavelength structure, the transmitted field will be periodic in both the polarization state and phase-front, therefore, we can expect this field to yield discrete diffraction orders. The interference between the diffraction orders in the near-field yields spatially intensity modulation. Evidently, the resulting interferogram pattern is directly related to the incident polarization state.

In this representation, a uniform periodic subwavelength structure, the grooves of which are oriented along the y-axis, can be described by the Jones matrix, $$J = \begin{pmatrix} t_x & 0 \\ 0 & t_y e^{i\phi} \end{pmatrix}, \quad (7)$$

where $t_x$ and $t_y$ are the real amplitude transmission coefficients for light polarized perpendicular and parallel to the optical axes and $\phi$ is the retardation of the grating. Consequently, the space-dependent transmission matrix of the QSG, can be described by $$T_C(x) = M(\theta(x))JM^{-1}(\theta(x)), \quad (8)$$

where $\theta(x)$ is the quantized local orientation of the optical axis given by Eq. (3) and FIG. 20(b), and $$M(\theta) = \begin{pmatrix} \cos\theta & -\sin\theta \\ \sin\theta & \cos\theta \end{pmatrix}$$

is the two-dimensional rotation matrix. Note that meanwhile, the polarizer is omitted from the optical system, and this will be referred further on.

For convenience, we convert $T_C(x)$ to the helicity basis, therefore, the space-variant polarization grating can be described by the matrix, $T(x) = UT_C U^{-1}$, where $$U = \frac{1}{\sqrt{2}}\begin{pmatrix} 1 & 1 \\ -i & i \end{pmatrix}$$

is a unitary conversion matrix. Explicit calculation of $T(x)$ yields, $$T(x) = \frac{1}{2}(t_x + t_y e^{i\phi})\begin{pmatrix} 1 & 0 \\ 0 & 1 \end{pmatrix} + \frac{1}{2}(t_x - t_y e^{i\phi})\begin{pmatrix} 0 & \exp[i2\theta(x)] \\ \exp[-i2\theta(x)] & 0 \end{pmatrix}. \quad (9)$$

We further adopt the Dirac's bra-ket notations, in which $|R\rangle = (1,0)^T$ and $|L\rangle = (0,1)^T$ are the two-dimensional unit vectors for right-hand and left-hand circularly polarized light. Thus, the resulting field is a product of an incident plane wave with arbitrary polarization $|E_{in}\rangle$ and the space-dependent transmission matrix $T(x)$ given by Eq. (9), yields $$|E_{out}\rangle = \eta_E|E_{in}\rangle + \eta_R e^{i2\theta(x,y)}|R\rangle + \eta_L e^{-i2\theta(x,y)}|L\rangle, \text{ where} \quad (10)$$

$$\eta_E = \frac{1}{2}(t_x - t_y e^{i\phi}), \eta_R = \frac{1}{2}(t_x - t_y e^{i\phi})\langle E_{in}|L\rangle,$$

$$\eta_L = \frac{1}{2}(t_x - t_y e^{i\phi})\langle E_{in}|R\rangle,$$

the complex field coefficients and $\langle\alpha|\beta\rangle$ denotes the inner product. From Eq. (10) it is evident that the emerging beam from the QSG, which is denoted by $|E_{out}\rangle$, comprises three polarization orders. The first maintains the original polarization state and phase of the incident beam, the second is right-hand circular polarized with a phase modification of $2\theta(x)$, while the third has a polarization direction and phase modification opposite to that of the former polarization order. Note that the phase modification of the $|R\rangle$ and $|L\rangle$ polarization orders results solely from local changes in the polarization state, therefore, is geometrical in nature.

Since $\theta(x)$ is a periodic function (Eq. (3), FIG. 2(b)), the functions $e^{i2\theta(x)}$ and $e^{-i2\theta(x)}$ in Eq. (10) can be expanded into the Fourier series. Taking into account the connection between the Fourier series of a conjugated functions $e^{i2\theta(x)}$ and $e^{-i2\theta(x)}$, leads to the equation, $$|E_{out}\rangle = \eta_E |E_{in}\rangle + \eta_R \sum_{m=-\infty}^{\infty} \alpha_m e^{i2\pi mx/d} |R\rangle + \eta_L \sum_{m=-\infty}^{\infty} \alpha_{-m}^* e^{i2\pi mx/d} |L\rangle, \quad (11)$$

where $\alpha_m = 1/2\pi \int e^{i2\theta(x)} e^{i2\pi mx/d} dx$. Based on Eq. (11) we find that the diffraction efficiency into the $m^{th}$ diffracted order of $|R\rangle$ polarization order, $(\eta_m^R = |\alpha_m|^2)$, is equal to the diffraction efficiency into the $-m^{th}$ diffracted order of $|L\rangle$ $(\eta_{-m}^L = |\alpha_m^*|^2)$, thus, $|R\rangle$ and $|L\rangle$ diffract adversely. Thereby, as depicted in FIG. 3, once a uniformly polarized beam is incident upon the QSG, the resulting beam comprises three polarization states described by Eq. (10), whereas, the polarization orders of $|R\rangle$ and $|L\rangle$ states are split into multiple diffraction orders due to the discontinuity of the phase, $2\theta(x)$.

In our near-field polarimetry concept, the wave-front emerging from the polarization grating is incident upon a linear polarizer, described in the helicity basis by Jones matrix of the form, $$P = \frac{1}{2}\begin{pmatrix} 1 & 1 \\ 1 & 1 \end{pmatrix}.$$

The linear polarized field emerging from the polarizer is given by the product of Eq. (11) and P, yielding, $$\tilde{E}_{out} = \frac{1}{\sqrt{2}}\left[\eta_E(\langle E_{in}|R\rangle + \langle E_{in}|L\rangle) + \eta_R \sum_{m=-\infty}^{\infty} \alpha_m e^{i2\pi mx/d} + \eta_L \sum_{m=-\infty}^{\infty} \alpha_{-m}^* e^{i2\pi mx/d}\right]. \quad (12)$$

Consequently, the intensity distribution is given by $|\tilde{E}_{out}|^2$, which results after some algebraic manipulations, to the identical expression as depicted in Eq. (4).

Note that by using a 4-f telescope configuration for imaging the emerging beam from our polarimeter, and inserting a spatial filter in the Fourier plane, the higher diffracted order can be eliminated due to the discontinuity of the phase, $2\theta(x)$. Therefore, this can result in an intensity distribution resembling the pattern obtained by the continuous grating based polarimeter.

The QSG element for $CO_2$ laser radiation of 10.6 μm wavelength was fabricated upon 500 μm-thick GaAs wafer with $\Lambda=2$ μm, d=2.5 mm, and N=16. The dimensions of the element were 30 mm×3 mm and consisted of 12 periods of d. Firstly, a binary chrome mask of the grating was fabricated using high-resolution laser lithography. The pattern was then transferred onto the GaAs wafer by use of photolithography, after which we etched the grating by electron cyclotron resonance with $BCl_3$ for 35 min, resulting in an approximate 2.5 μm groove depth. Finally, an antireflection coating was applied to the backside of the wafer. FIG. 20(c) shows a scanning electron microscopy image of a region upon the subwavelength structure, which we had fabricated, whereas FIG. 2o(d) depicts an image of a cross section of the subwavelength grooves.

Following the measurements, we used the setup depicted in FIG. 19 to test our concept for polarization measurements, whereby, a subwavelength metal wire grating was used as a polarizer. First, a calibration process was performed by illuminating the QSG followed by a polarizer with three different polarized beams. We determined the experimental optical parameters by fitting the curve of Eq. (4) to the measured intensity distributions with $t_x$, $t_y$, and $\phi$ of the QSG as free parameters. The calibration process yielded a QSG having $t_x=0.9$, $t_y=0.8$, and retardation $\phi=0.3\pi$ rad. These values are close to both the theoretical predictions that were achieved using a rigorous coupled wave analysis (P. Lalanne, and G. M. Morris, "Highly improved convergence of the coupled-wave method for TM polarization", J. Opt. Soc. Am. A 13, 779-784 (1996)) for a groove profile depicted in FIG. 20(d), and to the direct measurement of the optical parameters using ellipsometric techniques (E. Collet, Polarized Light (Marcel Dekker, New York, 1993)).

Figure 22:
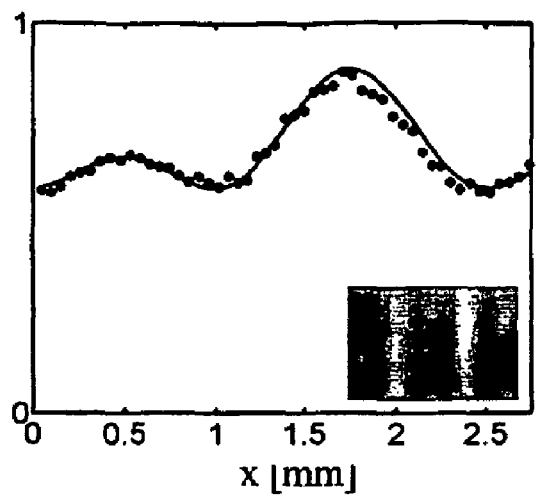
FIG. 22: Measured (dotes) and predicted (solid curves) of the normalized transmitted intensity as a function of the x coordinate along the QSG, when the fast axis of the rotating QWP was at angles of (a) 0°, (b) 20°, and (c) 45°; the insets show the experimental images of the of the near-field transmitted intensities.
Figure 22:
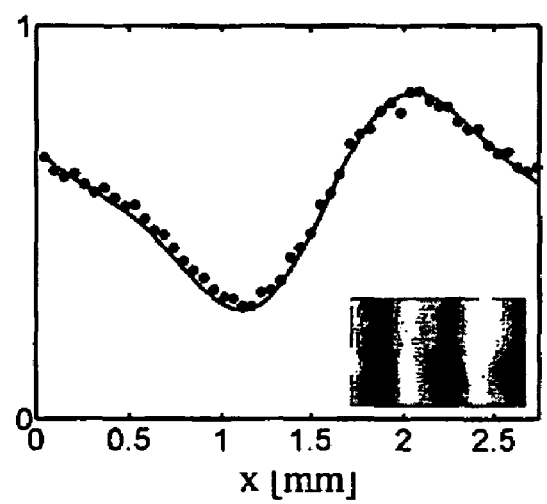
Figure 22:
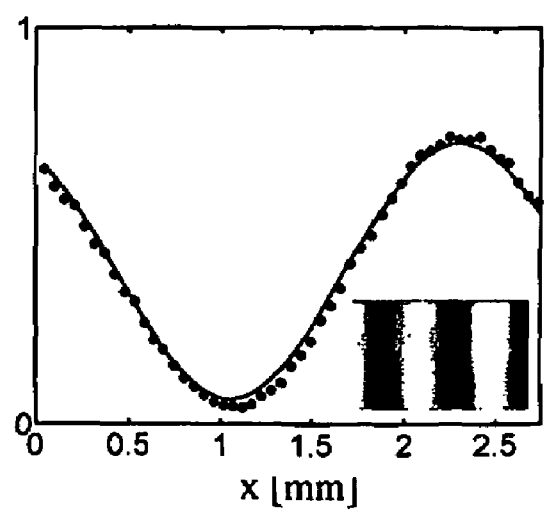
Figure 23:
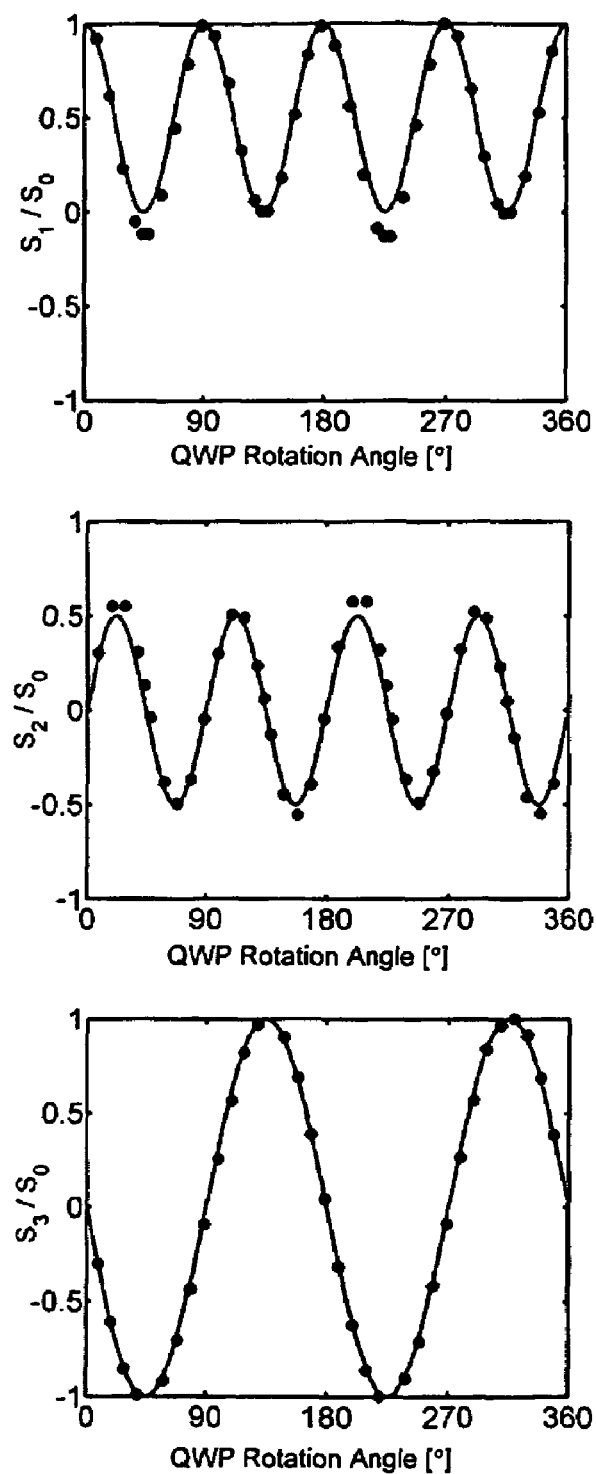
FIG. 23: Measured (dotes) and predicted (solid curves) values of the normalized Stokes parameters, (a) $S_1/S_0$, (b) $S_2/S_0$, (c) $S_3/S_0$, as a function of the orientation of the QWP.
Figure 24:
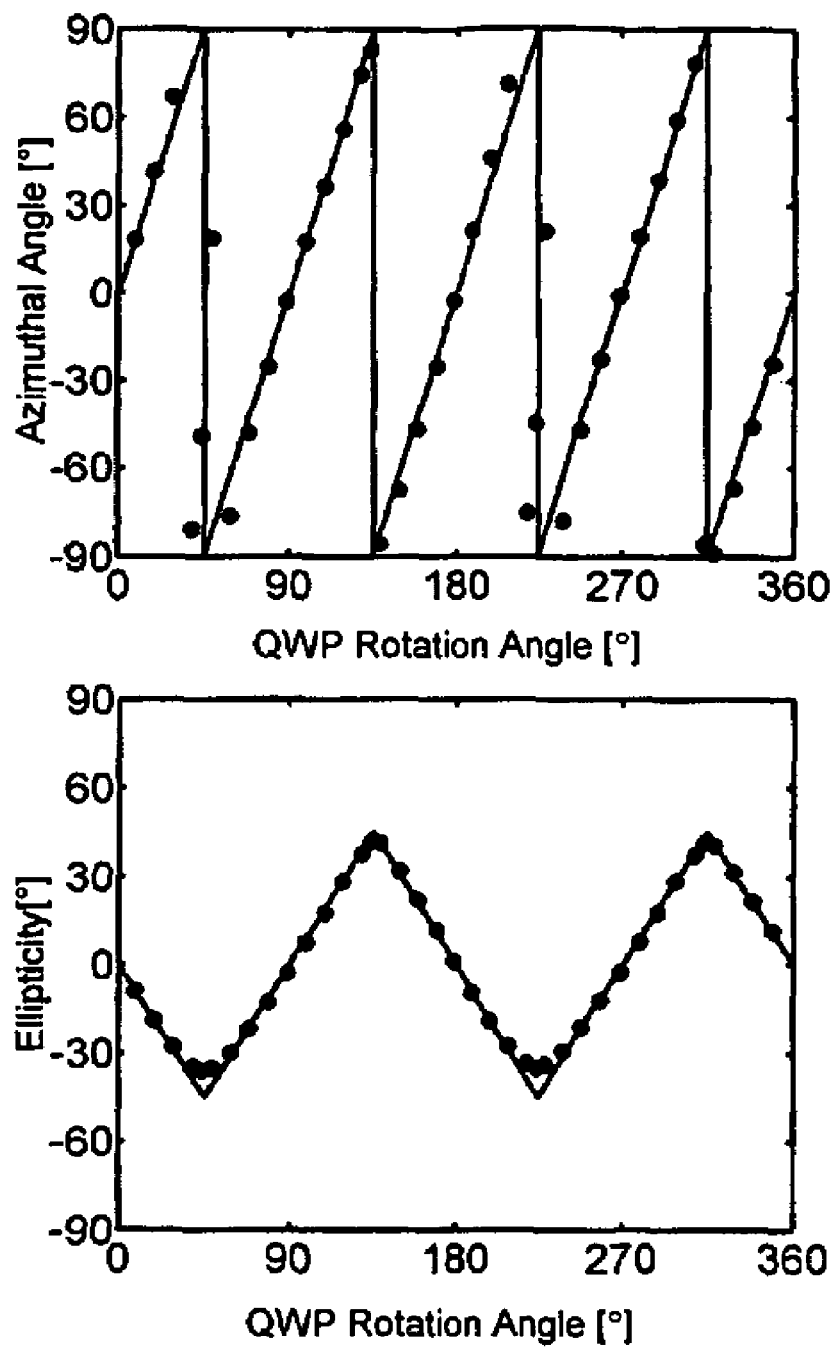
FIG. 24: Measured (dotes) and predicted results (solid curves) for (a) azimuthal angle ψ, and (b) ellipticity angle χ, as a function of the orientation of the QWP.

In order to test the ability of our device in conducting polarization measurements of fully polarized light, we used a $CO_2$ laser that emitted linearly polarized light at a wavelength of 10.6 μm and replaced the polarization-sensitive medium with a QWP. The images were captured by a Spiricon Pyrocam III, at a rate of 24 Hz. FIG. 22 shows the measured intensity distributions captured in a single camera frame, when the fast axis of the QWP was set at angles 0°, 20°, and 45°, as well as the predicted results calculated by Eq. (4) for A=1.45, B=0.17, C=0.8464, and D=1.165. Consequently, FIG. 23 shows the measured and predicted Stokes parameters of a resulting beam as a function of the orientation of the QWP. We determined the experimental values of $S_1$, $S_2$, and $S_3$ by using Eq. (6). There is a good agreement between the predictions and experimental results. Moreover, FIG. 6 shows the experimental and theoretical azimuthal angle, $\psi$, and ellipticity $\chi$, calculated from the data in FIG. 5, by use of the relations $\tan(2\psi)=S_2/S_1$ and $\sin(2\chi)=S_3/S_0$ [6]. The measurements yield a standard deviation error with respect to the theoretical prediction of 2.6° and 0.6° for the azimuthal angle and the ellipticity angle, respectively. The errors of the polarization measurements result mainly from systematic errors such as the nature of the algorithm, unprecision in the rotation of the QWP, optical performance of the QWP, low resolution of the IR camera and dynamic range, as well as statistical noise due to spatial and temporal fluctuation of the light emitted from the laser, shot noise and amplifier noise of the IR camera, pixel response nonuniformity, and quantization noise. The standard deviations in the azimuthal angle and ellipticity for a series of successive measurements were 0.2° and 0.07°, respectively.

Figure 25:
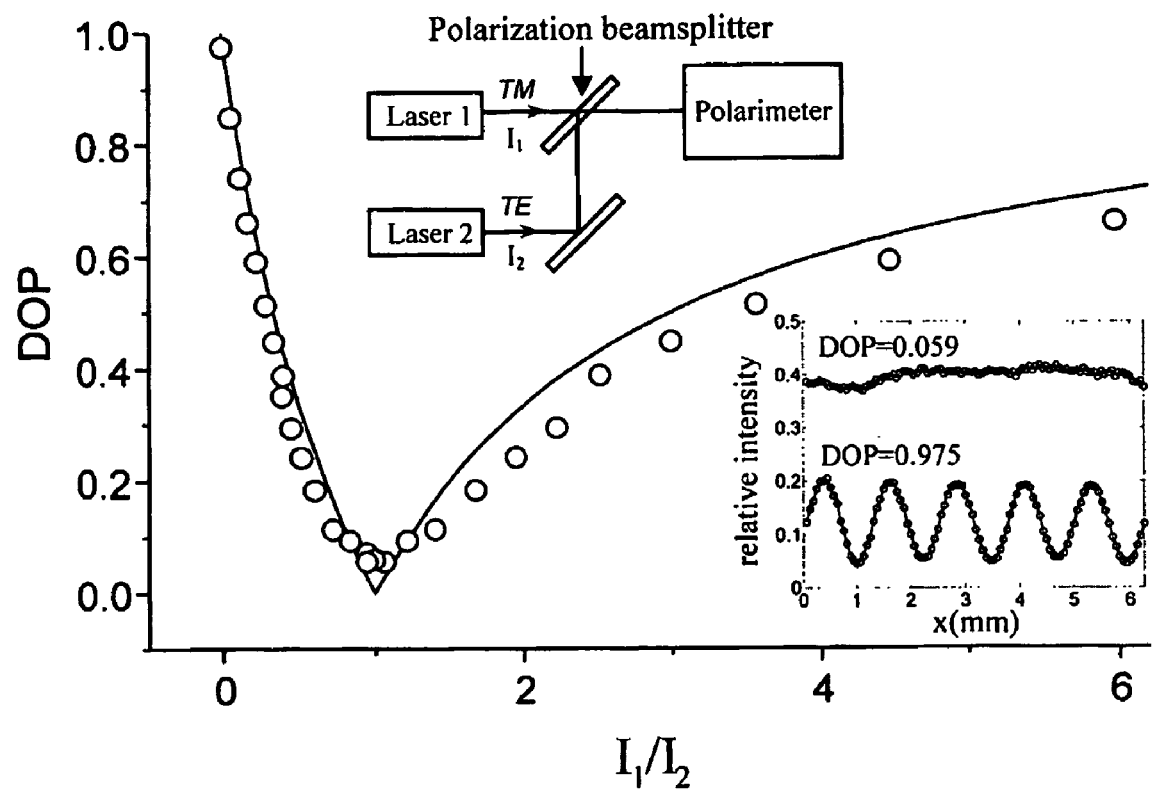
FIG. 25: The calculated (solid curve) and measured (circles) DOP as a function of the intensity ratio of the two independent lasers having orthogonal linear polarization states, as used in a setup depicted in the top inset. The bottom inset shows calculated (solid curves) and measured (dots)-intensity cross-sections for the two extremes, $I_1=I_2$ (DOP=0.059) and $I_2=0$ (DOP=0.975).

In order to demonstrate the use of a QSG for polarimetry of partially polarized beams, two independent $CO_2$ lasers of orthogonal linear polarization states were combined by use of the setup depicted in the inset at the top of FIG. 25. The degree of polarization (DOP) is defined by $DOP=\sqrt{S_1^2+S_2^2+S_3^2}/S_0$. For incoherent beam summation, the Stokes vector of the resulting beam is the sum of the Stokes of the combined beams. In the case of two orthogonal linear polarized beams, the DOP is given by $DOP=(I_1-I_2)/(I_1+I_2)$, were $I_1$ and $I_2$ are the intensities of the horizontally and vertically polarized beams, respectively. FIG. 25 shows the measured and predicted DOP as a function of the intensity ratio $I_1/I_2$. The inset shows the experimental intensity distributions for two extreme cases. The first is for equal intensities ($I_1=I_2$), in which the measured DOP is of 0.0059, indicating unpolarized light. The second is for illuminating a single laser only (i.e. $I_2=0$), in which the measured DOP results in 0.975, indicating fully polarized light. This experiment shows the ability to obtain all four Stokes parameters simultaneously, thereby, emphasizing the good agreement between prediction and measurement for partially polarized light.

We have theoretically analyzed and experimentally demonstrated the use of a computer-generated space-variant quantized subwavelength dielectric grating for real-time polarization measurement. The quantized subwavelength gratings are unlimited in their dimensions, have uniform optical properties ($t_x$, $t_y$ and $\phi$), and in general, are lightweight, compact and highly efficient. Both the space-variant subwavelength dielectric grating and the polarizer were realized using photolithographic techniques commonly used in the production of micro-electric devices. Therefore, the camera and the gratings could be combined into a single chip, resulting in a very small device for polarization measurements.

It should be clear that the description of the embodiments and attached Figures set forth in this specification serves only for a better understanding of the invention, without limiting its scope as covered by the following Claims or their equivalents.

It should also be clear that a person skilled in the art, after reading the present specification could make adjustments or amendments to the attached Figures and above described embodiments that would still be covered by the following Claims or their equivalents.

The invention claimed is:

1. A space variant polarization optical element for spatially manipulating polarization-dependent geometrical phases of an incident light beam, the element comprising a substrate comprising a plurality of zones of gratings with a continuously varying orientation, the orientation denoted by $\theta(x,y)$ which is equal to half of a desired geometrical phase (DGP) modulus $2\pi$, each grating with a local period that is smaller than the wavelength of the incident light beam.

2. The optical element of claim 1, wherein the orientation of the grating satisfies the equation $2\theta(x,y)=\pi r^2/\lambda f|_{mod\ 2\pi}$, where $f$ is a desired focal length and $\lambda$ is the wavelength of the incident light beam, whereby the optical element is used as a converging lens if the incident light beam exhibits right-hand circular polarization, and as a diverging lens if the incident light beam exhibits left-hand circular polarization.

3. The optical element of claim 1, wherein the following relation is maintained $\nabla \times K_g=0$, where $K_g=K_0(x,y)[\cos(\phi_d(x,y)/2)\hat{x}+\sin(\phi_d(x,y)/2)\hat{y}]$, where $K_g$ is a grating vector, $\hat{x}$ and $\hat{y}$ are unit vectors in the x and y direction, $K_0=2\pi/\Lambda(x,y)$, where $K_0$ is the spatial frequency of the grating, $\Lambda$ is the local period of the grating and $\phi_d(x,y)/2$ is the space-variant direction of the vector so that it is perpendicular to the grating stripes at any given point.

4. The optical element of claim 1, used as diffraction grating element, wherein the following equation is maintained $\phi_d=(2\pi/d)x|_{mod\ 2\pi}$, where d is the period of the plurality of zones, and wherein the grating satisfies the relation $\phi_g(x,y)=(2d/\Lambda_0)\sin(\pi x/d)\exp(-\pi y/d)$, where $\Lambda_0$ is the local period of the grating at y=0.

5. The optical element of claim 1, wherein the substrate is a wafer.

6. The optical element of claim 5, wherein the wafer is manufactured using photolithography techniques.

7. The optical element of claim 6, wherein the wafer is manufactured using etching.

8. The optical element of claim 1, wherein the grating is in blazed form, with opposite blazed directions for incident left-hand circular polarization and for right-hand circular polarization, of the incident light beam.

9. The optical element of claim 1, wherein the orientation of the gratings varies linearly in a predetermined direction.

10. The optical element of claim 1, wherein the orientation of the grating of the zones satisfies the equation $\theta(x)=-x/d|_{mod\ \pi}$, where $\theta(x)$ is the orientation of a grating line at a position x on an axis, and d is the period of the orientation of the grating of the zones.

11. The optical element of claim 1, wherein it is used as an optical switch.

12. The optical element of claim 1, wherein it is used as a beam-splitter.

13. The optical element of claim 1, used as a Lee-type binary subwavelength structure mask.

14. The optical element of claim 1, wherein it is used for polarimetry.

15. The optical element of claim 1, wherein the grating in each zone comprise of at least two regions of gratings arranged in different orientations.

16. The optical element of claim 1, wherein the following relation is satisfied, $\theta(x,y)=\omega(x,y)+c$, where x and y are coordinates of a specific position in an orthogonal set of axes, $\omega=\arctan(y/x)$ is the azimuthal angle, and c is a constant.

17. The optical element of claim 1, wherein the orientation of the grating is spiral.

18. The optical element of claim 1, wherein the orientation of the grating satisfies the relation $\theta(r,\omega)=l\omega/2$, where l is a topological charge, and $r,\omega$ indicate a specific angular position at radius r and angle $\omega$.

19. The optical element of claim 18, wherein the grating satisfy the relation $\phi_g(r,\omega)=(2\pi r_0/\Lambda_0)(r_0/r)^{l/2-1}\cos[(l/2-1)\omega]/[l/2-1]$ for $l\neq 2$, and $\phi_g(r,\omega)=(2\pi r_0/\Lambda_0)\ln(r/r_0)$ for $l=2$, where $\Lambda_0$ is the local period of the grating.

20. A space variant polarization optical element for spatially manipulating polarization-dependent geometrical phases of an incident light beam, the element comprising a substrate comprising a plurality of zones of gratings with discretely varying orientation, the orientation denoted by $\theta(x,y)$ which is equal to half of a desired geometrical phase (DGP) modulus $2\pi$, each grating with a local period that is substantially smaller than the wavelength of the incident light beam.

21. The optical element of claim 20, wherein the discretely varying orientation comprises rotated orientation.

22. The optical element of claim 21, wherein the rotated orientation varies linearly.

23. The optical element of claim 20, used as diffraction grating element, wherein the following equation is maintained $\phi_d=(2\pi/d)x|_{mod\ 2\pi}$, where d is the period of the plurality of zones, and wherein the grating satisfies the relation $\phi_g(x,y)=(2d/\Lambda_0)\sin(\pi x/d)\exp(-\pi y/d)$, where $\Lambda_0$ is the local period of the grating at y=0.

24. The optical element of claim 20, wherein the substrate is a wafer.

25. The optical element of claim 20, wherein the wafer is manufactured using photolithography techniques.

26. The optical element of claim 25, wherein the wafer is manufactured using etching.

27. The optical element of claim 20, wherein the orientation of the grating of the zones satisfies the equation $\theta(x)=-\pi x/d|_{mod\ \pi}$, where $\theta(x)$ is the orientation of a grating line at a position x on an axis, and d is the period of the orientation of the grating of the zones.

28. The optical element of claim 20, wherein it is used as an optical switch.

29. The optical element of claim 20, wherein it is used as a beam-splitter.

30. The optical element of claim 20, used as a Lee-type binary subwavelength structure mask.

31. The optical element of claim 20, wherein it is used for polarimetry.

32. The optical element of claim 20, wherein the grating in each zone comprise of at least two regions of gratings arranged in different orientations.

33. The optical element of claim 20, wherein the following relation is satisfied, $\theta(x,y)=\omega(x,y)+c$, where x and y are coordinates of a specific position in an orthogonal set of axes, $\omega=\arctan(y/x)$ is the azimuthal angle, and c is a constant.

34. The optical element of claim 20, wherein the orientation of the grating satisfies the relation $\theta(r,\omega)=l\omega/2$, where l is a topological charge, and r,$\omega$ indicate a specific angular position at radius r and angle $\omega$.

35. The optical element of claim 34, wherein the grating satisfy the relation $\phi_g(r,\omega)=(2\pi r_0/\Lambda_0)(r_0/r)^{l/2-1} \cos[(l/2-1)\omega]/[l/2-1]$ for $l\neq 2$, and $\phi_g(r,\omega)=(2\pi r_0/\Lambda_0)\ln(r/r_0)$ for $l=2$, where $\Lambda_0$ is the local period of the grating.

36. The optical element of claim 20, wherein the zones of gratings are arranged in an annular manner.

37. The optical element of claim 20, wherein the zones of gratings are arranged in a coaxial manner.

38. A method for spatially manipulating polarization-dependent geometrical phases of an incident light beam, the method comprising: providing a substrate comprising a plurality of zones of gratings, with a continuously varying orientation, the orientation denoted by $\theta(x,y)$ which is equal to half of a desired geometrical phase (DGP) modulus $2\pi$, each grating having a local period that is smaller than the wavelength of the incident light beam irradiating the incident light beam onto the substrate.

39. The method of claim 38, wherein the orientation of the grating satisfies the equation $2\theta(x,y)=\pi r^2 \lambda f|_{mod\, 2\pi}$, where $f$ is a desired focal length and $\lambda$ is the wavelength of the incident light beam, whereby the optical element is used as a converging lens if the incident light beam exhibits right-hand circular polarization, and as a diverging lens if the incident light beam exhibits left-hand circular polarization.

40. The method of claim 38, wherein the following relation is maintained $\nabla \times K_g=0$, where $K_g=K_0(x,y)[\cos(\phi_{(x,y)}/2)\hat{x}=\sin(\phi_d(x,y)/2)\hat{y}]$, where $K_g$ is a grating vector, $\hat{x}$ and $\hat{y}$ are unit vectors in the x and y direction, $K_0=2\pi/\Lambda(x,y)$, where $K_0$ is the spatial frequency of the grating, $\Lambda$ is the local period of the grating and $\phi_d(x,y)/2$ is the space-variant direction of the vector so that it is perpendicular to the grating stripes at any given point.

41. The method of claim 38, used as diffraction grating element, wherein the following equation is maintained $\phi_d=(2\pi/d)x|_{mod\, 2\pi}$, where d is the period of the plurality of zones, and wherein the grating satisfies the relation $\phi_g(x,y)=(2d/\Lambda_0)\sin(\pi x/d)\exp(-\pi y/d)$, where $\Lambda_0$ is the local period of the grating at $y=0$.

42. The method of claim 38, wherein the grating is in blazed form, with opposite blazed directions for incident left-hand circular polarization and for right-hand circular polarization, of the incident light beam.

43. The method of claim 38, wherein the orientation of the gratings varies linearly in a predetermined direction.

44. The method of claim 38, wherein the orientation of the grating of the zones satisfies the equation $\theta(x)=-\pi x/d|_{mod\, \pi}$, where $\theta(x)$ is the orientation of a grating line at a position x on an axis, and d is the period of the orientation of the grating of the zones.

45. The method of claim 38, wherein it is used for optical switching.

46. The method of claim 38, wherein it is used for beam-splitting.

47. The method of claim 38, wherein it is used for polarimetry.

48. The method of claim 38, wherein the grating in each zone comprise of at least two regions of gratings arranged in different orientations.

49. The method of claim 38, wherein the following relation is satisfied, $\theta(x,y)=\omega(x,y)+c$, where x and y are coordinates of a specific position in an orthogonal set of axes, $\omega=\arctan(y/x)$ is the azimuthal angle, and c is a constant.

50. The method of claim 38, wherein the orientation of the grating is spiral.

51. The method of claim 38, wherein the orientation of the grating satisfies the relation $\theta(r,\omega)=l\omega/2$, where l is a topological charge, and r,$\omega$ indicate a specific angular position at radius r and angle $\omega$.

52. The method of claim 51, wherein the grating satisfy the relation $\phi_g(r,\omega)=(2\pi r_0/\Lambda_0)(r_0/r)^{l/2-1} \cos[(l/2-1)\omega]/[l/2-1]$ for $l\neq 2$, and $\phi_g(r,\omega)=(2\pi r_0/\Lambda_0)\ln(r/r_0)$ for $l=2$, where $\Lambda_0$ is the local period of the grating.

53. A method for spatially manipulating polarization-dependent geometrical phases of an incident light beam, the method comprising:

providing a substrate comprising a plurality of zones of gratings with discretely varying orientation, the orientation denoted by $\theta(x,y)$ that is equal to half of a desired geometrical phase (DGP) modulus $2\pi$, each grating with a local period that is substantially smaller than the wavelength of the incident light beam;

irradiating the light beam on the substrate.

54. The method of claim 53, wherein the discretely varying orientation comprises rotated orientation.

55. The method of claim 54, wherein the rotated orientation varies linearly.

56. The method of claim 54, used as diffraction grating element, wherein the following equation is maintained $\phi_d=(2\pi/d)x|_{mod\, 2\pi}$, where d is the period of the plurality of zones, and wherein the grating satisfies the relation $\phi_g(x,y)=(2d/\Lambda_0)\sin(\pi x/d)\exp(-\pi y/d)$, where $\Lambda$ is the subwavelength period at $y=0$.

57. The method of claim 54, wherein the orientation of the grating of the zones satisfies the equation $\theta(x)=-\pi x/d|_{mod\, \pi}$, where $\theta(x)$ is the orientation of a grating line at a position x on an axis, and d is the period of the orientation of the grating of the zones.

58. The method of claim 53, wherein it is used for optical switching.

59. The method of claim 53, wherein it is used for beam-splitting.

60. The method of claim 53, wherein it is used for polarimetry.

61. The method of claim 53, wherein the grating in each zone comprise of at least two regions of gratings arranged in different orientations.

62. The method of claim 53, wherein the following relation is satisfied, $\theta(x,y)=\omega(x,y)+c$, where x and y are coordinates of a specific position in an orthogonal set of axes, $\omega=\arctan(y/x)$ is the azimuthal angle, and c is a constant.

63. The method of claim 53, wherein the orientation of the grating satisfies the relation, $\theta(r,\omega)=l\omega/2$, where l is a topological charge, and r,$\omega$ indicate a specific angular position at radius r and angle $\omega$.

64. The method of claim 63, wherein the grating satisfy the relation $\phi_g(r,\omega) = (2\pi r_0/\Lambda_0)(r_0/r)^{l/2-1} \cos[(l/2-1)\omega]/[l/2-1]$ for $l \neq 2$, and $\phi_g(r,\omega) = (2\pi r_0/\Lambda_0)\ln(r/r_0)$ for $l=2$, where $\Lambda_0$ is the local period of the grating.

65. The method of claim 53, wherein the zones of gratings are arranged in an annular manner.

66. The method of claim 53, wherein the zones of gratings are arranged in a coaxial manner.

* * * * *